United States Patent
Zhang et al.

(10) Patent No.: US 11,483,860 B2
(45) Date of Patent: Oct. 25, 2022

(54) WIDEBAND CONTROL SIGNAL TRANSMISSION

(71) Applicant: QUALCOMM Incorporated, San Diego, CA (US)

(72) Inventors: Xiaoxia Zhang, San Diego, CA (US); Mostafa Khoshnevisan, San Diego, CA (US); Wooseok Nam, San Diego, CA (US); Tao Luo, San Diego, CA (US); Jing Sun, San Diego, CA (US); Sungwoo Park, Seoul (KR); Arumugam Chendamarai Kannan, San Diego, CA (US); Vinay Chande, San Diego, CA (US); Hua Wang, Basking Ridge, NJ (US); Yongbin Wei, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 51 days.

(21) Appl. No.: 17/105,321

(22) Filed: Nov. 25, 2020

(65) Prior Publication Data

US 2021/0219335 A1 Jul. 15, 2021

Related U.S. Application Data

(60) Provisional application No. 62/961,619, filed on Jan. 15, 2020.

(51) Int. Cl.
*H04W 52/02* (2009.01)
*H04W 74/00* (2009.01)
*H04W 76/28* (2018.01)

(52) U.S. Cl.
CPC ..... *H04W 74/006* (2013.01); *H04W 52/0235* (2013.01); *H04W 76/28* (2018.02)

(58) Field of Classification Search
CPC .......... H04W 52/0235; H04W 52/0229; Y02D 30/70
See application file for complete search history.

(56) References Cited

U.S. PATENT DOCUMENTS

| 2016/0345206 A1 | 11/2016 | Yerramalli et al. |
| 2019/0053320 A1 | 2/2019 | Islam et al. |

(Continued)

FOREIGN PATENT DOCUMENTS

WO  WO-2019113834 A1  6/2019

OTHER PUBLICATIONS

International Search Report and Written Opinion—PCT/US2020/062613—ISA/EPO—dated Feb. 17, 2021.

*Primary Examiner* — Robert C Scheibel
(74) *Attorney, Agent, or Firm* — Holland & Hart LLP/Qualcomm Incorporated

(57) ABSTRACT

Methods, systems, and devices for wireless communications are described. A base station may configure a user equipment (UE) with a multiple listen-before-talk (LBT) bandwidths, where each LBT bandwidth is associated with one or more downlink control channel candidates of a search space for a control resource set. The UE may monitor the LBT bandwidths during a wakeup signal period for a wakeup signal from the base station. The UE may be configured with a total number of blind hypotheses in the set of blind hypotheses which is equal to or greater than a total number of LBT bandwidths. The UE may determine whether to wake up and monitor an on duration of a discontinuous reception cycle based on detection of the wakeup signal.

28 Claims, 19 Drawing Sheets

(56) References Cited

U.S. PATENT DOCUMENTS

| | | |
|---|---|---|
| 2019/0230706 A1* | 7/2019 | Li .................... H04W 72/0453 |
| 2019/0296847 A1 | 9/2019 | Sun et al. |
| 2019/0297577 A1 | 9/2019 | Lin et al. |
| 2020/0052803 A1* | 2/2020 | Deenoo ................ H04B 17/318 |
| 2021/0058970 A1* | 2/2021 | Kwak .................. H04L 5/0032 |
| 2021/0168780 A1* | 6/2021 | Li .................... H04W 72/0446 |
| 2022/0070934 A1* | 3/2022 | Yang .................... H04W 74/08 |
| 2022/0078781 A1* | 3/2022 | Zhou .................... H04W 16/14 |
| 2022/0078834 A1* | 3/2022 | Wu ...................... H04L 5/0092 |

* cited by examiner

WIDEBAND CONTROL SIGNAL TRANSMISSION

CROSS REFERENCE

The present application for patent claims the benefit of U.S. Provisional Patent Application No. 62/961,619 by ZHANG et al., entitled "WIDEBAND CONTROL SIGNAL TRANSMISSION," filed Jan. 15, 2020, assigned to the assignee hereof, and expressly incorporated herein.

BACKGROUND

The following relates generally to wireless communications, and more specifically to wideband control signal transmission.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

SUMMARY

The described techniques relate to improved methods, systems, devices, and apparatuses that support wideband control signal transmission. Generally, the described techniques provide for configuring a user equipment (UE) with enough blind decoding hypotheses to detect a control signal transmission when the UE is configured with multiple listen-before-talk (LBT) bandwidths. For example, in some systems, a UE may monitor for a wakeup signal during a pre-wakeup gap to determine whether the UE has pending communications from a base station. If the UE detects the wakeup signal, the UE may monitor for signaling during an "on duration" of the DRX cycle. If the UE does not detect the wakeup signal, the UE may not monitor the on duration and instead may remain in a low power state until the next pre-wakeup gap.

Some wireless communications systems may support configuring a UE with a wideband control resource set. For a control resource set configuration in a serving cell with a carrier bandwidth greater than an LBT bandwidth, a search space set configuration associated with the control resource set may have multiple monitoring locations in the frequency domain. For example, the search space for the control resource set may be split into multiple LBT bandwidths. When a system bandwidth has multiple LBT bandwidths, a UE may search up to as many LBT bandwidths to detect the control signal. By implementing techniques described herein, a UE may be configured with enough blind hypotheses to reliably detect a control signal when the UE is configured with multiple LBT bandwidths. In some cases, the UE may be configured for at least as many blind hypotheses for control signal detection as there are LBT bandwidths. In some cases, a UE may monitor for subsets of LBT bandwidths across different configured monitoring occasions, which may reduce a number of blind hypotheses in each occasion. Additional techniques are described for associating LBT bandwidths with beams or transmit configuration indicator (TCI) states.

A method of wireless communications at a UE is described. The method may include receiving, from a base station, a configuration for a set of listen-before-talk bandwidths, where each listen-before-talk bandwidth of the set of listen-before-talk bandwidths is associated with one or more downlink control channel candidates of a search space for a control resource set and monitoring one or more listen-before-talk bandwidths of the set of listen-before-talk bandwidths based on a set of blind hypotheses associated with the listen-before-talk bandwidths, where a total number of blind hypotheses in the set of blind hypotheses is equal to or greater than a total number of listen-before-talk bandwidths in the set of listen-before-talk bandwidths.

An apparatus for wireless communications at a UE is described. The apparatus may include a processor, memory coupled with the processor, and instructions stored in the memory. The instructions may be executable by the processor to cause the apparatus to receive, from a base station, a configuration for a set of listen-before-talk bandwidths, where each listen-before-talk bandwidth of the set of listen-before-talk bandwidths is associated with one or more downlink control channel candidates of a search space for a control resource set and monitor one or more listen-before-talk bandwidths of the set of listen-before-talk bandwidths based on a set of blind hypotheses associated with the listen-before-talk bandwidths, where a total number of blind hypotheses in the set of blind hypotheses is equal to or greater than a total number of listen-before-talk bandwidths in the set of listen-before-talk bandwidths.

Another apparatus for wireless communications at a UE is described. The apparatus may include means for receiving, from a base station, a configuration for a set of listen-before-talk bandwidths, where each listen-before-talk bandwidth of the set of listen-before-talk bandwidths is associated with one or more downlink control channel candidates of a search space for a control resource set and monitoring one or more listen-before-talk bandwidths of the set of listen-before-talk bandwidths based on a set of blind hypotheses associated with the listen-before-talk bandwidths, where a total number of blind hypotheses in the set of blind hypotheses is equal to or greater than a total number of listen-before-talk bandwidths in the set of listen-before-talk bandwidths.

A non-transitory computer-readable medium storing code for wireless communications at a UE is described. The code may include instructions executable by a processor to receive, from a base station, a configuration for a set of listen-before-talk bandwidths, where each listen-before-talk bandwidth of the set of listen-before-talk bandwidths is associated with one or more downlink control channel candidates of a search space for a control resource set and monitor one or more listen-before-talk bandwidths of the set of listen-before-talk bandwidths based on a set of blind hypotheses associated with the listen-before-talk bandwidths, where a total number of blind hypotheses in the set of blind hypotheses is equal to or greater than a total number of listen-before-talk bandwidths in the set of listen-before-talk bandwidths.

In some examples of the method, apparatuses, and non-transitory computer-readable medium described herein, monitoring one or more of the set of listen-before-talk bandwidths may include operations, features, means, or instructions for monitoring the one or more listen before-talk bandwidths during a wakeup signal period for a wakeup signal from the base station, and determining whether to wake up and monitor a DRX duration based on a detection of the wakeup signal.

Some examples of the method, apparatuses, and non-transitory computer-readable medium described herein may further include operations, features, means, or instructions for detecting the wakeup signal based on the monitoring, and monitoring for a downlink control channel signal during the DRX duration based on the detected wakeup signal.

Some examples of the method, apparatuses, and non-transitory computer-readable medium described herein may further include operations, features, means, or instructions for determining the wakeup signal was not received during the wakeup signal period based on the monitoring, and remaining in a low power state for the DRX duration.

In some examples of the method, apparatuses, and non-transitory computer-readable medium described herein, monitoring one or more of the set of listen-before-talk bandwidths may include operations, features, means, or instructions for monitoring, during a first monitoring occasion, a first subset of the set of listen-before-talk bandwidths based on a first subset of the set of blind hypotheses, and monitoring, during a second monitoring occasion, a second subset of the set of listen-before-talk bandwidths based on a second subset of the set of blind hypotheses.

Some examples of the method, apparatuses, and non-transitory computer-readable medium described herein may further include operations, features, means, or instructions for receiving from the base station an indication of the first subset of the set of listen-before-talk bandwidths and the second subset of the set of listen-before-talk bandwidths.

In some examples of the method, apparatuses, and non-transitory computer-readable medium described herein, receiving the indication of the first subset of the set of listen-before-talk bandwidths and the second subset of the set of listen-before-talk bandwidths may include operations, features, means, or instructions for receiving in connection with the configuration for the set of listen-before-talk bandwidths, a control resource set configuration including the indication of the first subset of the set of listen-before-talk bandwidths and the second subset of the set of listen-before-talk bandwidths.

In some examples of the method, apparatuses, and non-transitory computer-readable medium described herein, monitoring one or more of the set of listen-before-talk bandwidths may include operations, features, means, or instructions for monitoring a first listen-before-talk bandwidth of the set of listen-before-talk bandwidths using a first beam, and monitoring a second listen-before-talk bandwidth of the set of listen-before-talk bandwidths using a second beam.

In some examples of the method, apparatuses, and non-transitory computer-readable medium described herein, monitoring one or more of the set of listen-before-talk bandwidths may include operations, features, means, or instructions for receiving from the base station a transmission configuration indicator (TCI) for each listen-before-talk bandwidth of the set of listen-before-talk bandwidths, and determining the first beam and the second beam respectively based on the TCI received for each of the first listen-before-talk bandwidth and the second listen-before-talk bandwidth.

Some examples of the method, apparatuses, and non-transitory computer-readable medium described herein may further include operations, features, means, or instructions for monitoring for downlink control information from the base station.

A method of wireless communications at a base station is described. The method may include transmitting, to a UE, a configuration for a set of listen-before-talk bandwidths, where each listen-before-talk bandwidth of the set of listen-before-talk bandwidths is associated with one or more downlink control channel candidates of a search space for a control resource set and transmitting, on a listen-before-talk bandwidth of the set of listen-before-talk bandwidths, downlink control information based on the UE being configured with a total number of blind hypotheses in the set of blind hypotheses that is equal to or greater than a total number of listen-before-talk bandwidths in the set of listen-before-talk bandwidths.

An apparatus for wireless communications at a base station is described. The apparatus may include a processor, memory coupled with the processor, and instructions stored in the memory. The instructions may be executable by the processor to cause the apparatus to transmit, to a UE, a configuration for a set of listen-before-talk bandwidths, where each listen-before-talk bandwidth of the set of listen-before-talk bandwidths is associated with one or more downlink control channel candidates of a search space for a control resource set and transmit, on a listen-before-talk bandwidth of the set of listen-before-talk bandwidths, downlink control information based on the UE being configured with a total number of blind hypotheses in the set of blind hypotheses that is equal to or greater than a total number of listen-before-talk bandwidths in the set of listen-before-talk bandwidths.

Another apparatus for wireless communications at a base station is described. The apparatus may include means for transmitting, to a UE, a configuration for a set of listen-before-talk bandwidths, where each listen-before-talk bandwidth of the set of listen-before-talk bandwidths is associated with one or more downlink control channel candidates of a search space for a control resource set and transmitting, on a listen-before-talk bandwidth of the set of listen-before-talk bandwidths, downlink control information based on the UE being configured with a total number of blind hypotheses in the set of blind hypotheses that is equal to or greater than a total number of listen-before-talk bandwidths in the set of listen-before-talk bandwidths.

A non-transitory computer-readable medium storing code for wireless communications at a base station is described. The code may include instructions executable by a processor to transmit, to a UE, a configuration for a set of listen-before-talk bandwidths, where each listen-before-talk bandwidth of the set of listen-before-talk bandwidths is associated with one or more downlink control channel candidates of a search space for a control resource set and transmit, on a listen-before-talk bandwidth of the set of listen-before-talk bandwidths, downlink control information based on the UE being configured with a total number of blind hypotheses in the set of blind hypotheses that is equal to or greater than a total number of listen-before-talk bandwidths in the set of listen-before-talk bandwidths.

In some examples of the method, apparatuses, and non-transitory computer-readable medium described herein, transmitting the downlink control information further may include operations, features, means, or instructions for transmitting a wakeup signal during a wakeup signal period of the UE, and transmitting to the UE on the one or more listenbefore-talk bandwidths during a DRX duration based on transmitting the wakeup signal.

In some examples of the method, apparatuses, and non-transitory computer-readable medium described herein, transmitting the downlink control information further may include operations, features, means, or instructions for transmitting the downlink control information during a first transmit occasion on the listen-before-talk bandwidth based on a first subset of listen-before-talk bandwidths of the set of listen-before-talk bandwidths including a first subset of downlink control channel candidates; or, and transmitting the downlink control information during a second transmit occasion on the listen-before-talk bandwidth based on a second subset of listen-before-talk bandwidths of the set of listen-before-talk bandwidths including a second subset of downlink control channel candidates.

Some examples of the method, apparatuses, and non-transitory computer-readable medium described herein may further include operations, features, means, or instructions for transmitting an indication of the first subset of the set of listen-before-talk bandwidths and the second subset of the set of listen-before-talk bandwidths.

In some examples of the method, apparatuses, and non-transitory computer-readable medium described herein, transmitting the indication of the first subset of the set of listen-before-talk bandwidths and the second subset of the set of listen-before-talk bandwidths may include operations, features, means, or instructions for transmitting in connection with the configuration for the set of listen-before-talk bandwidths, a control resource set configuration including the indication of the first subset of the set of listen-before-talk bandwidths and the second subset of the set of listen-before-talk bandwidths.

In some examples of the method, apparatuses, and non-transitory computer-readable medium described herein, transmitting the downlink control information further may include operations, features, means, or instructions for transmitting the downlink control information using a beam associated with the listen-before-talk bandwidth.

Some examples of the method, apparatuses, and non-transitory computer-readable medium described herein may further include operations, features, means, or instructions for transmitting a corresponding transmission configuration indicator (TCI) state for each listen-before-talk bandwidth of the set of listen-before-talk bandwidths, where each listen-before-talk bandwidth of the set of listen-before-talk bandwidths may be associated with a corresponding beam based on the corresponding TCI state.

DETAILED DESCRIPTION

A wireless communications system may use a discontinuous reception (DRX) cycle to improve power usage and battery performance for devices. In some systems, a user equipment (UE) may monitor a number of control channel hypotheses for a control signal. For example, the UE may monitor for a wakeup signal during a pre-wakeup gap to determine whether the UE has pending communications from a base station. If the UE detects the wakeup signal, the UE may monitor for signaling during an "on duration" of the DRX cycle. If the UE does not detect the wakeup signal, the UE may not monitor the on duration and instead may remain in a low power state until the next pre-wakeup gap. In some wireless systems, to provide additional power savings, the UE may be configured with a limited number of downlink control channel hypotheses for the wakeup signal, which may improve detection rates and reduce processing power for the UE to detect the wakeup signal.

Some wireless communications systems may support a wideband control resource set for a UE. For a control resource set configuration in a serving cell with a carrier bandwidth greater than a listen-before-talk (LBT) bandwidth, a search space set configuration associated with the control resource set may have multiple monitoring locations in the frequency domain. For example, the search space for the control resource set may be split into multiple LBT bandwidths. When a system bandwidth has multiple LBT bandwidths, a UE may search up to as many LBT bandwidths to detect the control signal. Some systems may not provide enough downlink control channel blind hypotheses for a UE to detect the control signal. If the UE cannot detect the wakeup signal, the UE may miss control or data information.

By implementing techniques described herein, a UE may be configured with enough blind hypotheses to reliably detect a control signal when the UE is configured with multiple LBT bandwidths. In some cases, the UE may be configured for at least as many blind hypotheses for control signal detection as there are LBT bandwidths. In some cases, a UE may monitor for subsets of LBT bandwidths across different configured monitoring occasions, which may reduce a number of blind hypotheses in each occasion. Additional techniques are described for associating LBT bandwidths with beams or transmit configuration indicator (TCI) states.

Aspects of the disclosure are initially described in the context of a wireless communications system. Aspects of the disclosure are further illustrated by and described with reference to apparatus diagrams, system diagrams, and flowcharts that relate to wideband control signal transmission.

Figure 1:
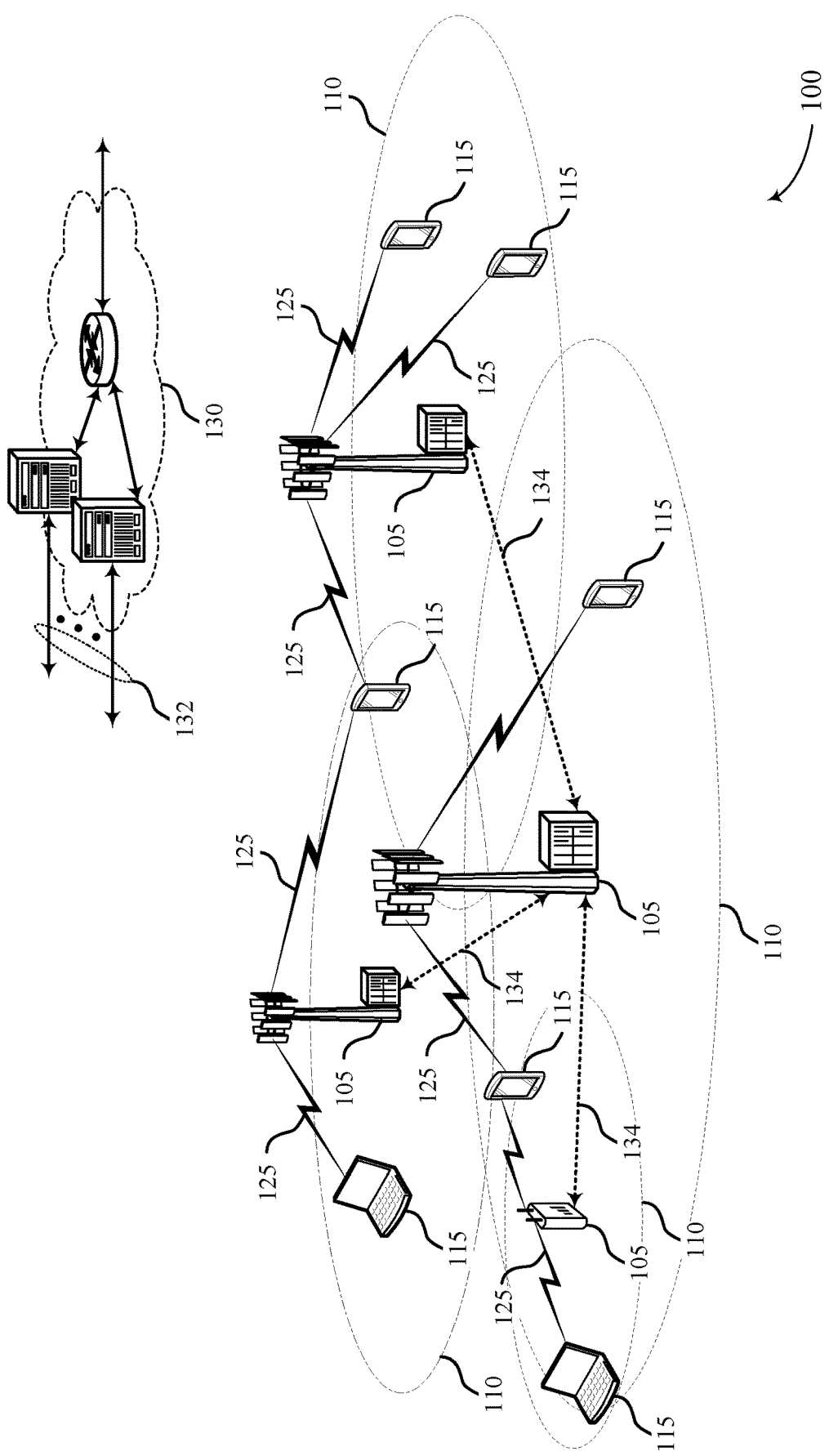
FIG. 1 illustrates an example of a system for wireless communications that supports wideband control signal transmission in accordance with aspects of the present disclosure.

FIG. 1 illustrates an example of a wireless communications system 100 that supports wideband control signal transmission in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P)

or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ LBT procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Some wireless communications systems, such as the wireless communications system 100, may use a DRX cycle to improve power usage and battery performance for devices. In some systems, a UE 115 may monitor for a control signal during a configured monitoring occasion. For example, the UE 115 may monitor for a wakeup signal during a pre-wakeup gap to determine whether the UE 115 has pending communications from a base station. If the UE 115 detects the wakeup signal, the UE 115 may monitor for signaling during an "on duration" of the DRX cycle. If the UE does not detect the wakeup signal, the UE 115 may not monitor the on duration and instead may remain in a low power state until the next pre-wakeup gap.

In some cases, the wakeup signal may be transmitted in downlink control information. A power saving radio network temporary identifier (PS-RNTI) may be used to scramble the wakeup signal. During wakeup signal detection, a reduced set of hardware may be activated at the UE 115 for PDCCH processing to detect the wakeup signal.

In some cases, the wakeup signal may be configured based on a search space configuration. For example, a search space information element may include parameters or configurations for the wakeup signal. Some configurations, such as configurations for monitoring symbols within a slot and a slot periodicity and offset monitoring, may be used to configure the wakeup signal. In some cases, multiple occasions may be configured for wakeup signal monitoring within the pre-wakeup window.

The wireless communications system 100 may support a wideband control resource set for a UE. For a control resource set configuration in a serving cell with a carrier bandwidth greater than a LBT bandwidth, a search space set configuration associated with the control resource set may have multiple monitoring locations in the frequency domain. For example, the search space for the control resource set may be split into multiple LBT bandwidths. When a system bandwidth has multiple LBT bandwidths, a UE 115 may search up to as many LBT bandwidths to detect the wakeup signal.

By implementing techniques described herein, a UE 115 may be configured with enough blind hypotheses to reliably detect a control signal, such as a wakeup signal, when the UE 115 is configured with multiple LBT bandwidths. In some cases, the UE 115 may be configured for at least as many blind hypotheses for control signal detection as there are LBT bandwidths. In some cases, a UE 115 may monitor for subsets of LBT bandwidths across different configured monitoring occasions, which may reduce a number of blind hypotheses in each occasion. Additional techniques are described for associating LBT bandwidths with beams or TCI states.

Figure 2:
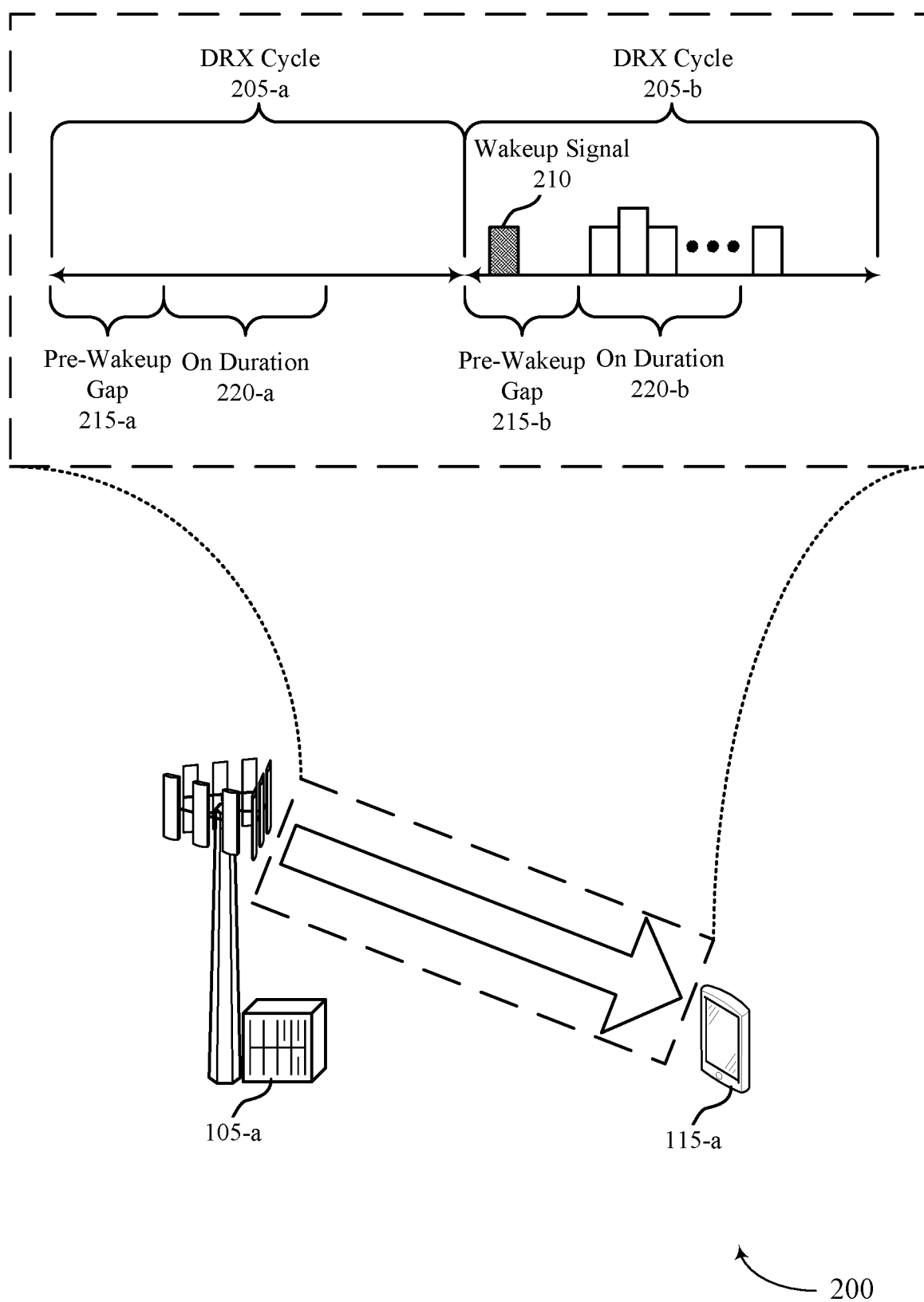
FIG. 2 illustrates an example of a wireless communications system that supports wideband control signal transmission in accordance with aspects of the present disclosure.

FIG. 2 illustrates an example of a wireless communications system 200 that supports wideband control signal transmission in accordance with aspects of the present disclosure. In some examples, the wireless communications system 200 may implement aspects of wireless communication system 100. Wireless communications system 200 may include UE 115-a and base station 105-a, which may be respective examples of a UE 115 and a base station 105 described with reference to FIG. 1. In some cases, the wireless communications system 200 may support unlicensed communications or shared spectrum communications.

Some devices in wireless communications system 200, such as UE 115-a, may use a DRX cycle 205 to improve power usage efficiency and battery performance. For example, UE 115-a may monitor for a wakeup signal 210 during a pre-wakeup gap 215 to determine whether UE 115-a has pending communications from base station 105-a. If UE 115-a does not detect the wakeup signal 210, UE 115-a may not monitor the on duration 220 and instead may remain in a low power state until the next pre-wakeup gap 215. For example, in DRX cycle 205-a, UE 115-a does not detect a wakeup signal 210 during pre-wakeup gap 215-a, so UE 115-a remains in a low power state for on duration 220-a.

If UE 115-a does detect the wakeup signal 210, UE 115-a may monitor for signaling during the on duration 220 of the DRX cycle 205. For example, UE 115-a may detect the wakeup signal 210 during pre-wakeup gap 215-b of DRX cycle 205-b. Therefore, UE 115-a may monitor for on duration 220-b based on detecting the wakeup signal 210. Base station 105-a may send control information scheduling UE 115-a for data communications. Once UE 115-a receives downlink control channel signaling (e.g., physical downlink control channel (PDCCH) signaling), UE 115-a may begin an inactivity timer. Once the inactivity timer expires (e.g., without UE 115-a receiving any additional PDCCH), UE 115-a may enter the low power state again.

In some wireless systems, to provide additional power savings, a UE 115 may be configured with a limited number of downlink control channel hypotheses for the wakeup signal, which may improve detection rates and reduce processing power for the UE 115 to detect the wakeup signal. For example, some systems support just one or two PDCCH hypotheses for wakeup signals for power saving.

The wireless communications system 200 may support configuring a wideband control resource set for a UE 115. In some cases, a control resource set may be confined with an LBT bandwidth. For a control resource set configuration in a serving cell with a carrier bandwidth greater than an LBT bandwidth, a search space set configuration associated with the control resource set may have multiple monitoring locations in the frequency domain. For example, the search space for the control resource set may be split into multiple LBT bandwidths. Physical resource blocks allocated by a base station 105 (e.g., according to a value for a parameter such as "frequencyDomainResources") in the control resource set configuration may be confined within one of the LBT bandwidths within the bandwidth part corresponding to the control resource set.

Within the search space set configuration associated with the control resource set, each of the one or more monitoring locations in the frequency domain may correspond to, and be confined within, an LBT bandwidth. In some cases, the one or more monitoring locations may have the same control resource set parameters other than a frequency domain resource allocation pattern parameter. For example, each of the monitoring locations may have a different frequency domain resource allocation pattern configuration. In some cases, the resources within the LBT bandwidths containing PDCCH candidates may be referred to as images. A search space set may be mapped in the images and confined with an LBT bandwidth. For example, each PDCCH candidates may be confined within a given frequency domain location.

When a system bandwidth has multiple LBT bandwidths, a UE 115 may search up to as many LBT bandwidths to detect the wakeup signal. The PDCCH candidates may be confined within the LBT bandwidths, so the base station 105 may obtain access to any one of the LBT bandwidths and transmit the wakeup signal on the LBT bandwidth. The UE 115 may search the PDCCH candidates according to one or more blind decoding hypotheses to obtain the wakeup signal. A blind hypothesis may correspond to a possible encoding configuration or resource assignment for a signal. For example, the UE 115 may be indicated a region for the control resource set, but not a specific location or resource size for the signal. Therefore, the UE 115 may attempt to decode at one or more locations within the region, which are the blind hypotheses, to obtain the signal. Some systems may not provide enough downlink control channel blind hypotheses for a UE 115 to detect the wakeup signal. If the UE 115 cannot detect the wakeup signal, the UE 115 may miss control or data information.

By implementing techniques described herein, a UE 115, such as UE 115-a, may be configured with enough blind hypotheses to reliably detect a wakeup signal when the UE 115 is configured with multiple LBT bandwidths. In some cases, the UE 115 may be configured for at least as many blind hypotheses for wakeup signal detection as there are LBT bandwidths. To ensure that UE 115-a can detect the wakeup signal when base station 105-a has medium access on any LBT bandwidth in the system bandwidth, the number of blind hypotheses may be no less than the number of LBT bandwidths. UE 115-a may then search each LBT bandwidth for the wakeup signal, attempting to decode the control channel candidates in each LBT bandwidth according to at least one of the blind hypotheses to obtain the wakeup signal.

In some cases, UE 115-a may monitor for subsets of LBT bandwidths across different configured wakeup time monitoring occasions, which may reduce a number of blind hypotheses in each occasion. For example, when UE 115-a is configured for multiple time domain occasions for wakeup signal monitoring, each occasion may correspond to different monitoring locations in the frequency domain.

Additional techniques are described for associating LBT bandwidths with beams or TCI states. In some cases, multiple transmit reception points (TRPs) may be used to increase downlink signaling reliability. Therefore, different LBT bandwidths may be associated with the different TCI states, which may correspond to the different TRPs. For example, a first LBT bandwidth may correspond to a first TCI state, and a second LBT bandwidth may correspond to a second TCI state.

In some cases, a UE 115 may be configured with a smaller number of blind hypotheses than LBT bandwidths for other control channels as well. For example, the UE 115 may be configured with more LBT bandwidths than blind decodings for downlink control information with DCI format 2_0 and channel occupancy time indications (e.g., channel occupancy time system information). In an example, the UE 115 may be configured with four LBT bandwidths, but the UE 115 may be configured to perform three blind decodings to detect channel occupancy time system information. Therefore, the UE 115 may support techniques for time-varying frequency locations for other types of downlink control information as well.

Figure 3:
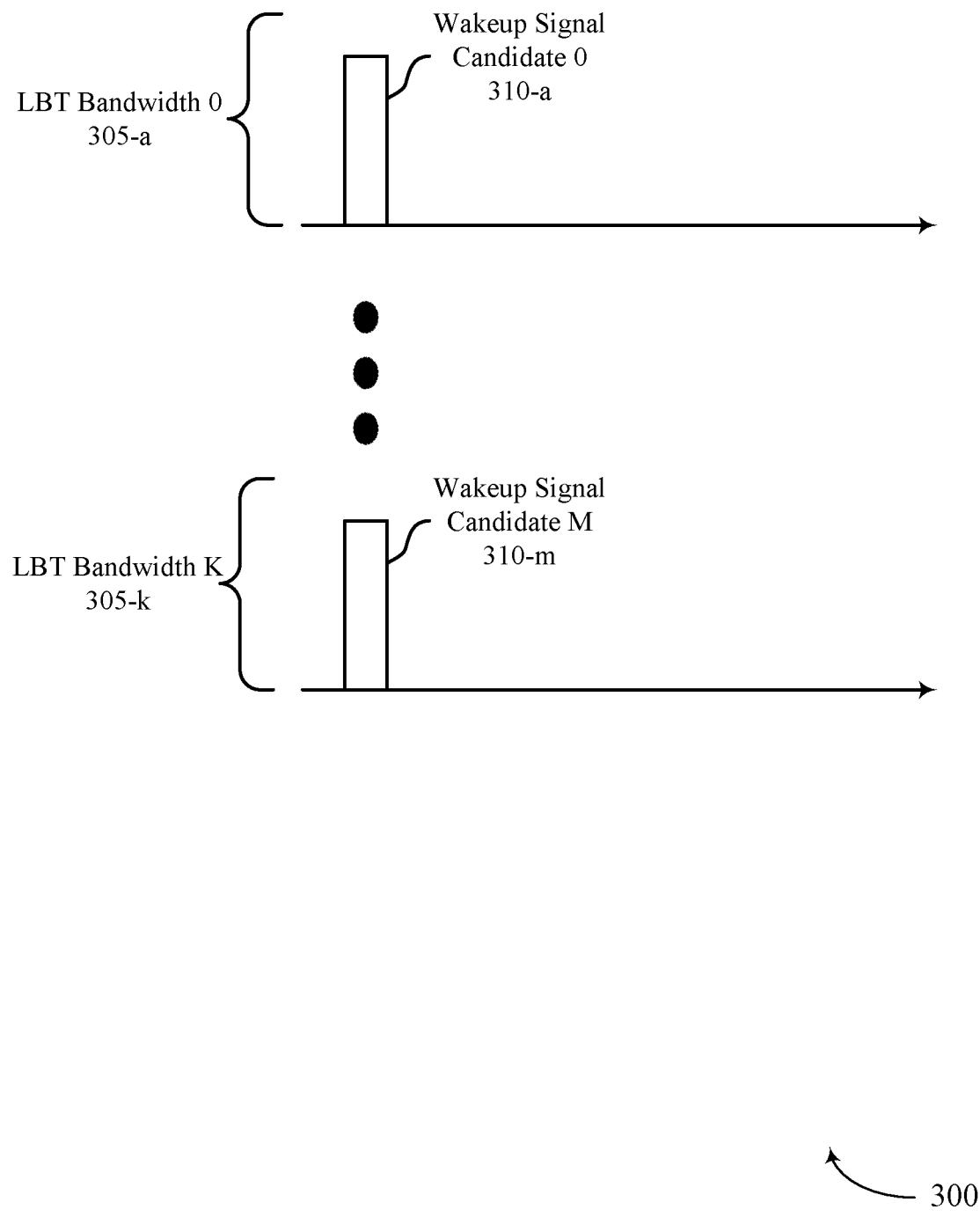
FIG. 3 illustrates an example of a listen-before-talk (LBT) bandwidth configuration that supports wideband control signal transmission in accordance with aspects of the present disclosure.

FIG. 3 illustrates an example of an LBT bandwidth configuration 300 that supports wideband control signal transmission in accordance with aspects of the present disclosure. In some examples, the LBT bandwidth configuration 300 may implement aspects of wireless communication system 100.

A control resource set for a wakeup signal for a UE 115 may have decoding candidates across multiple monitoring locations (e.g., LBT bandwidths 305) in the frequency domain. The UE 115 may then have multiple LBT bandwidths 305 to search to detect the wakeup signal. To ensure that the UE 115 can identify the wakeup signal when a serving base station 105 has access on any of the LBT bandwidths 305 within the system bandwidth, the UE 115 may be configured with at least as many blind hypotheses for wakeup signal detection.

For example, a UE 115 may be configured with K LBT bandwidths 305, from LBT bandwidth 0 305-a to LBT bandwidth K 305-k. The UE 115 may then be configured with M blind hypotheses for wakeup signal detection, where M≥K. At least wakeup signal candidate 0 310-a may be in LBT bandwidth 0 305-a, and at least wakeup signal candidate M 310-m may be in LBT bandwidth K 305-k. In some cases, there may be multiple wakeup signal candidates 310 in each LBT bandwidth 305.

Figure 4:
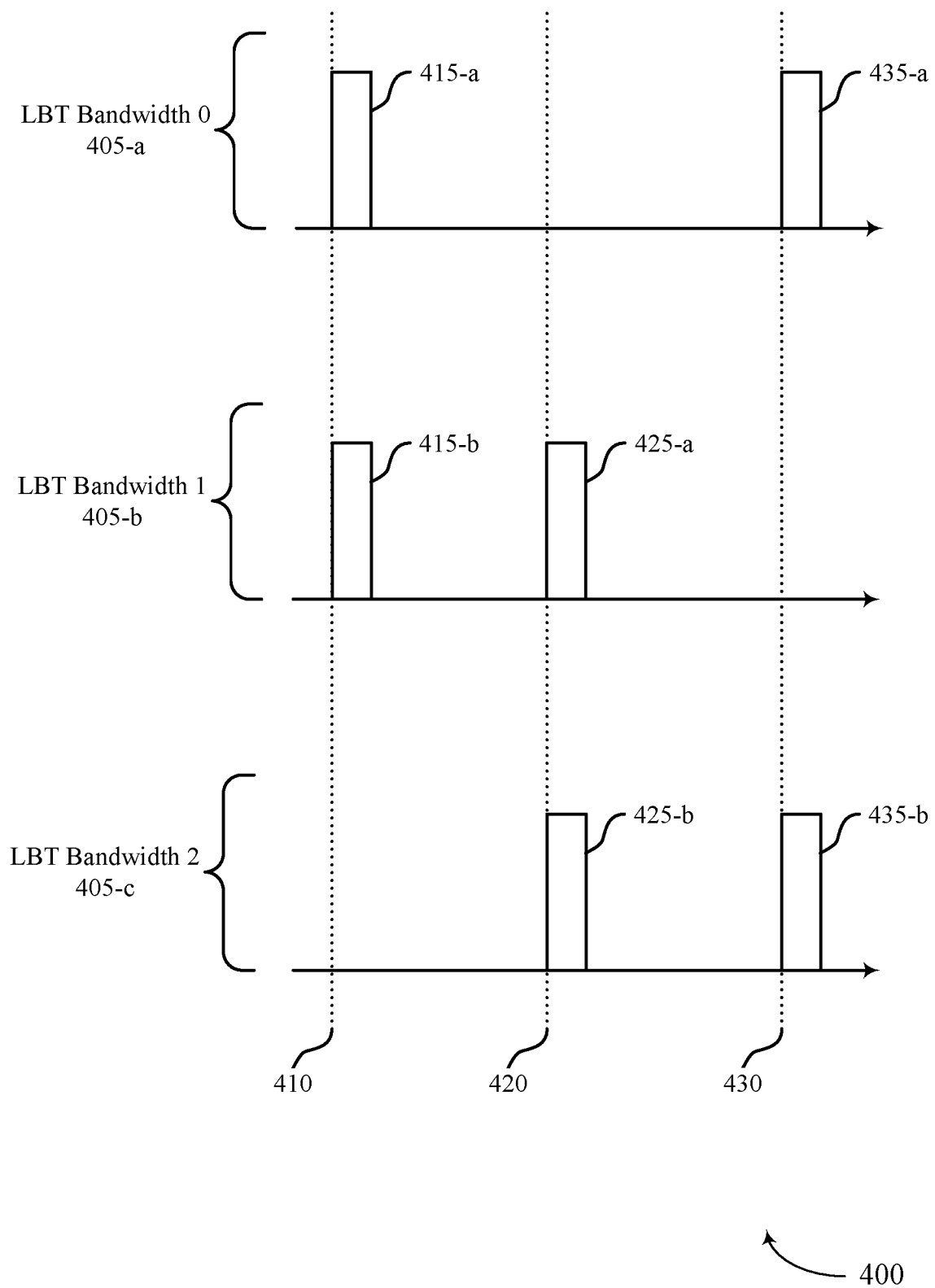
FIG. 4 illustrates an example of an LBT bandwidth configuration that supports wideband control signal transmission in accordance with aspects of the present disclosure.

FIG. 4 illustrates an example of an LBT bandwidth configuration 400 that supports wideband control signal transmission in accordance with aspects of the present disclosure. In some examples, the LBT bandwidth configuration 400 may implement aspects of wireless communication system 100. A control resource set for a wakeup signal for a UE 115 may have decoding candidates across multiple monitoring locations (e.g., LBT bandwidths 405) in the frequency domain. The UE 115 may then have multiple LBT bandwidths 405 to search to detect the wakeup signal. To ensure that the UE 115 can identify the wakeup signal when a serving base station 105 has access on any of the LBT bandwidths 405 within the system bandwidth, the UE 115 may be configured with at least as many blind hypotheses for wakeup signal detection.

In an example, a UE 115 may be configured with three LBT bandwidths 405, including LBT bandwidth 0 405-a, LBT bandwidth 1 405-b, and LBT bandwidth 2 405-c. The UE 115 may also be configured with at least three wakeup signal candidates. To reduce a number of PDCCH decodings performed by the UE 115 at one time, different LBT bandwidths 405 may be associated with different time domain occasions.

For example, at a first occasion 410, the UE 115 may monitor image 415-a on LBT bandwidth 405-a and image 415-b on LBT bandwidth 405-b for the wakeup signal. If the UE 115 does not detect the wakeup signal, at a second occasion 420, the UE 115 may monitor image 425-a on LBT bandwidth 405-b and image 425-b on LBT bandwidth 405-c. If the UE 115 still does not detect the wakeup signal, the UE 115 may, at a third occasion 430, monitor image 435-a on LBT bandwidth 405-a and image 435-b on LBT bandwidth 405-c. Therefore, LBT bandwidth 405-a and LBT bandwidth 405-b may be associated with the first occasion 410, LBT bandwidth 405-b and LBT bandwidth 405-c may be associated with the second occasion 420, and LBT bandwidth 405-a and LBT bandwidth 405-c may be associated with the third occasion 430.

By associating subsets of LBT bandwidths 405 with different monitoring occasions, the number of blind hypotheses in each occasion may be minimized. Therefore, UEs 115 with a small number of blind hypotheses may still support multiple LBT bandwidths. These UEs 115 may still achieve frequency domain diversity across multiple LBT bandwidths over multiple wakeup signal occasions. In some cases, the monitoring occasions and LBT bandwidths may be configured by a base station 105, for example when the base station 105 configures the control resource set for a UE 115.

In some examples, a base station 105 may utilize multiple TRPs to increase downlink signaling reliability. For example, the base station 105, or another network controller or network entity, may send downlink signaling for a UE 115 from different TRPs, which may be in different directions from the UE 115. Therefore, different LBT bandwidths 405 may further be associated with different TCI states. The different TCI states may correspond to different beams, or different TRPs in different directions. For example, LBT bandwidth 405-a may be associated with a first TCI state (e.g., TCI1), LBT bandwidth 405-b may be associated with a second TCI state (e.g., TCI2), and LBT bandwidth 405-c may be associated with a third TCI state (e.g., TCI3). In an example, at the first occasion 410, the UE 115 may monitor LBT bandwidth 405-a using a first beam associated with the first TCI state for a wakeup signal from a first TRP, and the UE 115 may monitor LBT bandwidth 405-b using a second beam associated with the second TCI state for the wakeup signal from a second TRP.

In some cases, other types of downlink control information may be configured for different subsets of LBT bandwidths 405 across different monitoring occasions. For example, downlink control information with Format 2_0 or a channel occupancy time system information message may be configured to be transmitted according to the time-varying frequency locations. For example, at a first occasion 410, the UE 115 may monitor image 415-a on LBT bandwidth 405-a and image 415-b on LBT bandwidth 405-b for the downlink control information. If the UE 115 does not detect the downlink control information, at a second occasion 420, the UE 115 may monitor image 425-a on LBT bandwidth 405-b and image 425-b on LBT bandwidth 405-c for the downlink control information. If the UE 115 still does not detect the downlink control information, the UE 115 may, at a third occasion 430, monitor image 435-a on LBT bandwidth 405-a and image 435-b on LBT bandwidth 405-c for the downlink control information.

Figure 5:
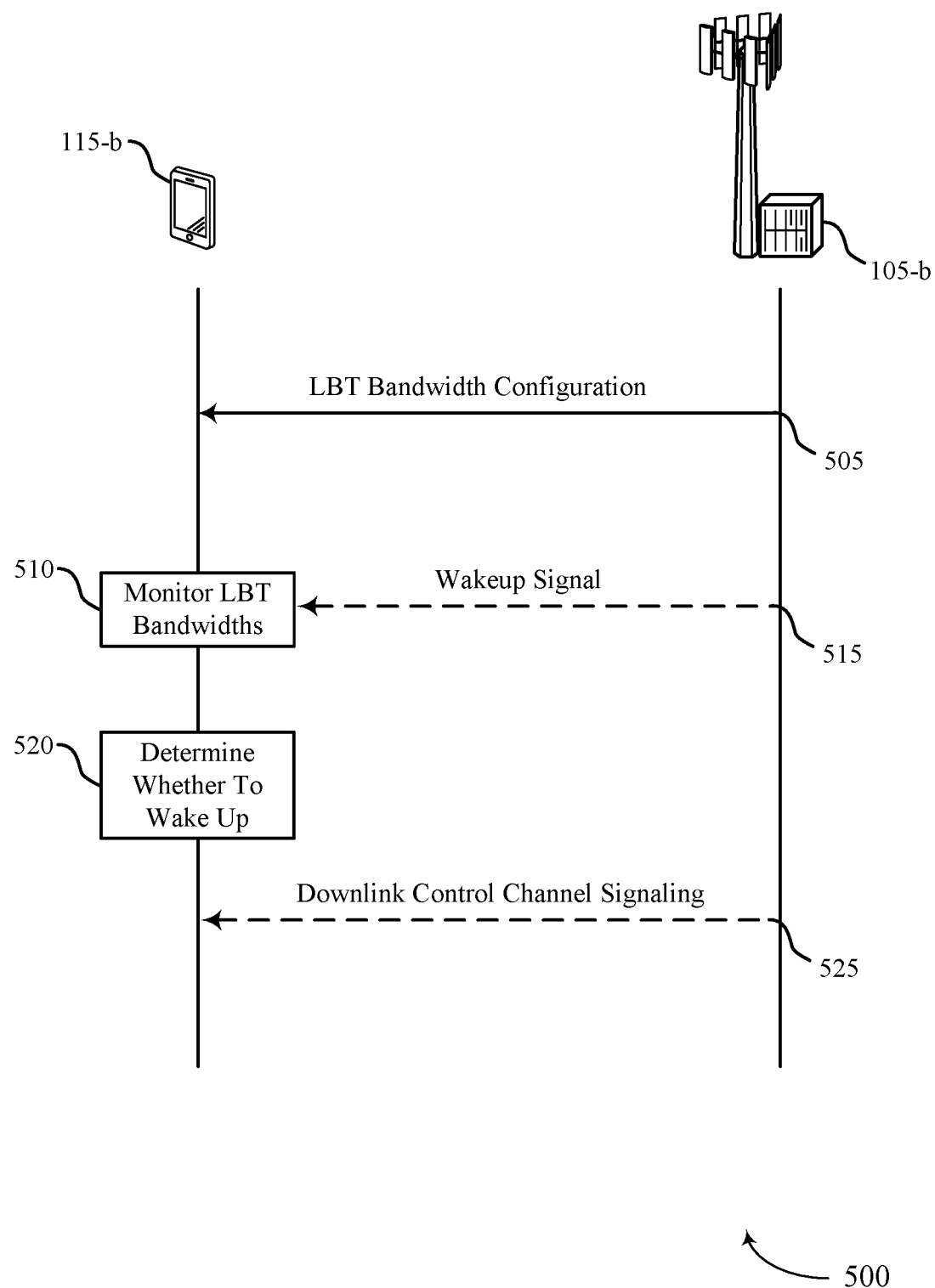
FIG. 5 illustrates an example of a process flow that supports wideband control signal transmission in accordance with aspects of the present disclosure.

FIG. 5 illustrates an example of a process flow 500 that supports wideband control signal transmission in accordance with aspects of the present disclosure. In some examples, process flow 500 may implement aspects of wireless communication system 100. The process flow 500 may include UE 115-b and base station 105-b, which may be respective examples of a UE 115 and a base station 105 as described herein. UE 115-b may be configured with a DRX cycle as described herein. UE 115-b may monitor for a wakeup signal during a pre-wakeup duration of the DRX cycle to determine whether base station 105-b has a pending downlink control channel transmission for UE 115-b.

At 505, UE 115-b may receive, from base station 105-b, a configuration for multiple LBT bandwidths. Each LBT bandwidth may be associated with one or more downlink control channel candidates of a search space for a control resource set. In some cases, the configuration may be included with a configuration for the control resource set for UE 115-b.

At 510, UE 115-b may monitor one or more LBT bandwidths during a wakeup signal period for a wakeup signal from base station 105-b based on a set of blind hypotheses associated with the LBT bandwidths. The total number of blind hypotheses may be equal to or greater than a total number of LBT bandwidths in the multiple LBT bandwidths. In some cases, UE 115-b may monitor, during a first monitoring occasion of the wakeup signal period, a first subset of the LBT bandwidths based on a first subset of blind hypotheses, and UE 115-b may monitor, during a second monitoring occasion of the wakeup signal period, a second subset of LBT bandwidths based on a second subset of blind hypotheses. For example, different LBT bandwidths may be associated with different monitoring occasions as described with reference to FIG. 4. At 515, base station 105-b may, in some cases, transmit the wakeup signal to UE 115-b during a wakeup signal period of UE 115-b.

At 520, UE 115-b may determine whether to wake up and monitor a DRX duration based on a detection of the wakeup signal. For example, UE 115-b may detect the wakeup signal based on the monitoring, and UE 115-b may wake up and monitor for a downlink control channel signal during the DRX duration (e.g., the on duration of the DRX cycle). UE 115-b may then monitor for downlink control channel signaling from base station 105-b at 525. If UE 115-b determines the wakeup signal was not received during the wakeup signal period, UE 115-b may remain in a low power state for the DRX duration.

Figure 6:
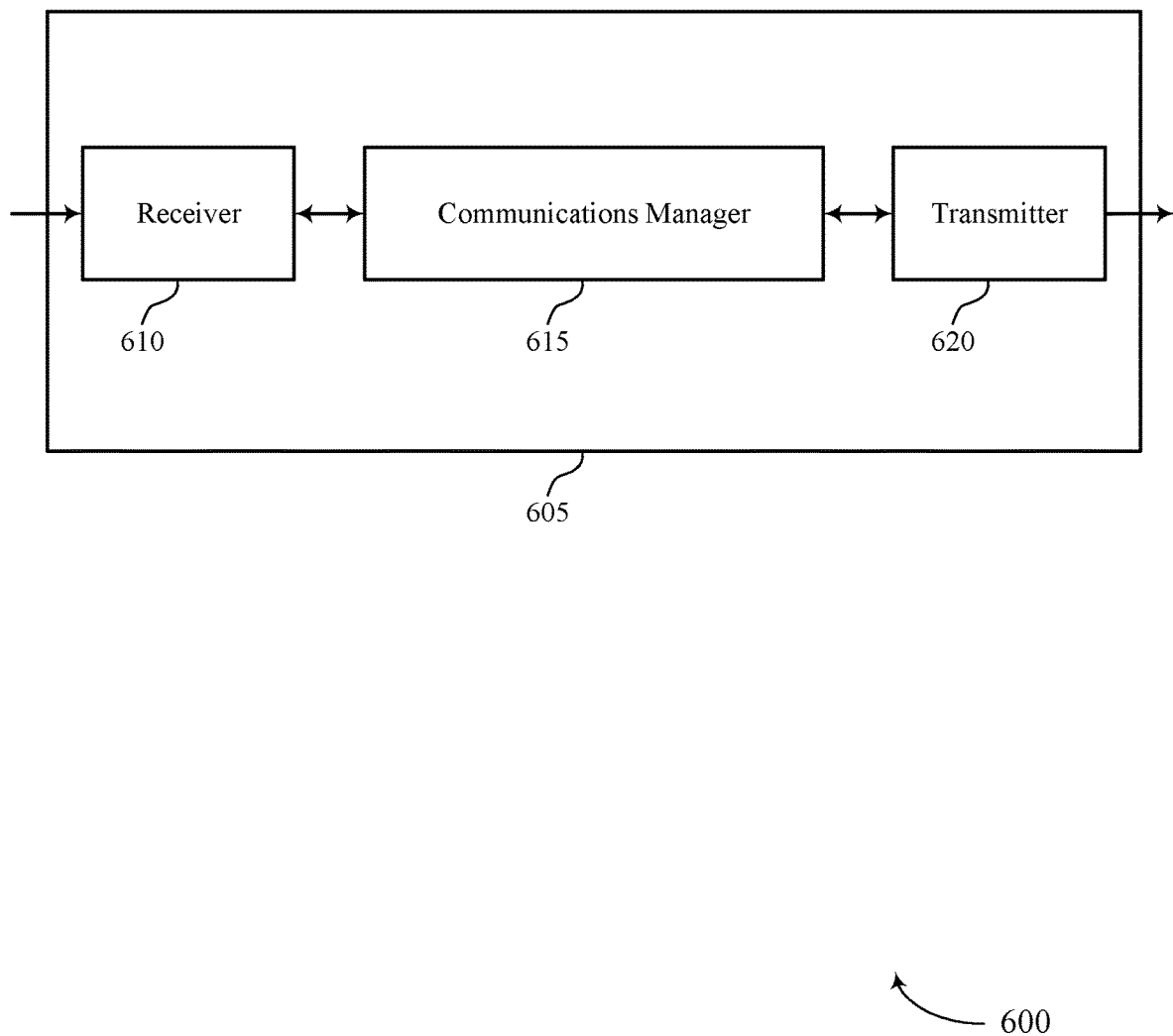
FIGS. 6 and 7 show block diagrams of devices that support wideband control signal transmission in accordance with aspects of the present disclosure.

FIG. 6 shows a block diagram 600 of a device 605 that supports wideband control signal transmission in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to wideband control signal transmission, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may receive, from a base station, a configuration for a set of listen-before-talk bandwidths, where each listen-before-talk bandwidth of the set of listen-before-talk bandwidths is associated with one or more downlink control channel candidates of a search space for a control resource set and monitor one or more listen-before-talk bandwidths of the set of listen-before-talk bandwidths based on a set of blind hypotheses associated with the listen-before-talk bandwidths, where a total number of blind hypotheses in the set of blind hypotheses is equal to or greater than a total number of listen-before-talk bandwidths in the set of listen-before-talk bandwidths. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
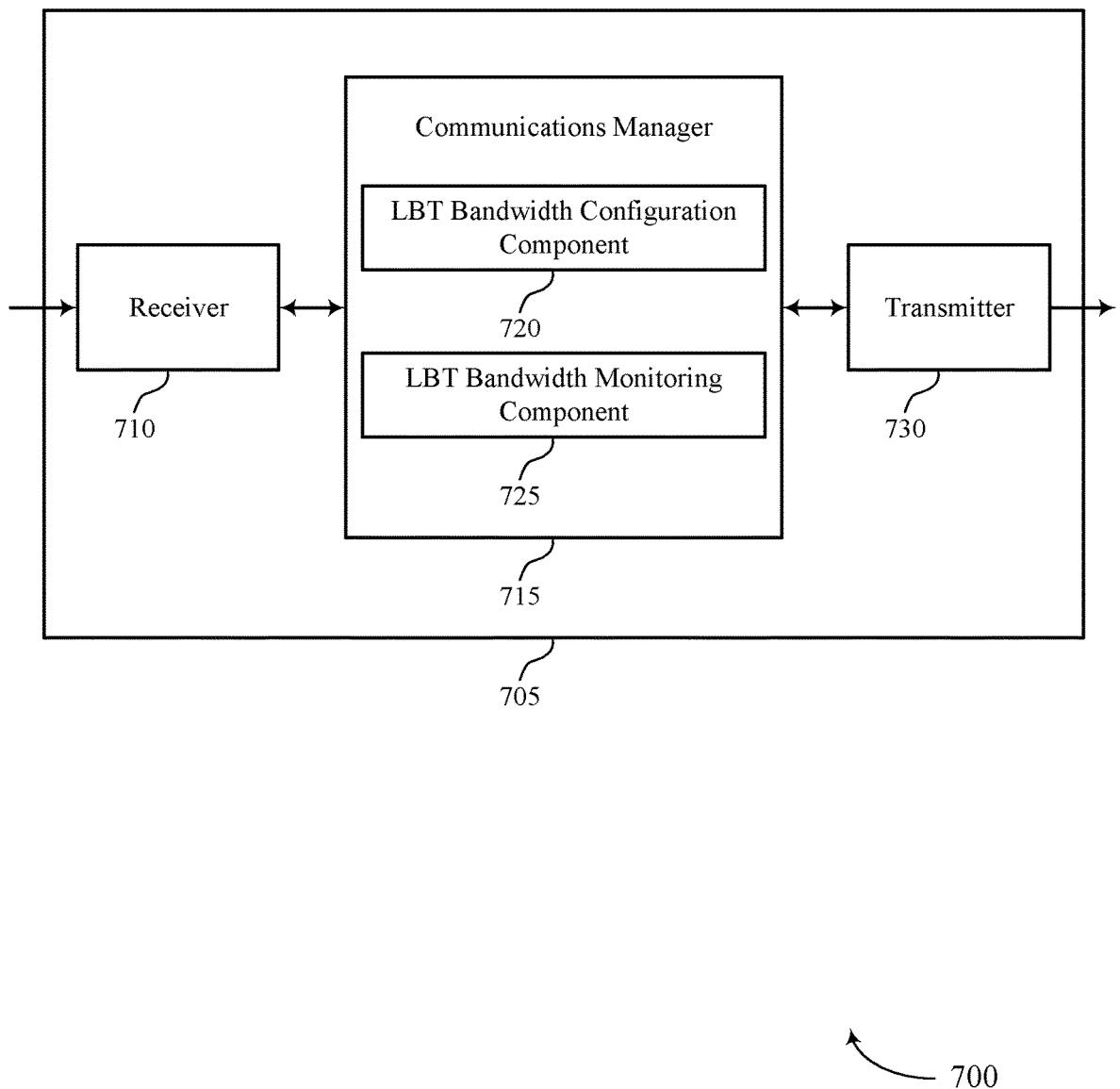

FIG. 7 shows a block diagram 700 of a device 705 that supports wideband control signal transmission in accordance with aspects of the present disclosure. The device 705 may be an example of aspects of a device 605, or a UE 115 as described herein. The device 705 may include a receiver 710, a communications manager 715, and a transmitter 730. The device 705 may also include a processor. Each of these components may be in communication with one another (e.g., via one or more buses).

The receiver 710 may receive information such as packets, user data, or control information associated with various information channels (e.g., control channels, data channels, and information related to wideband control signal transmission, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a LBT bandwidth configuration component 720 and a LBT bandwidth monitoring component 725. The communications manager 715 may be an example of aspects of the communications manager 910 described herein.

The LBT bandwidth configuration component 720 may receive, from a base station, a configuration for a set of listen-before-talk bandwidths, where each listen-before-talk bandwidth of the set of listen-before-talk bandwidths is associated with one or more downlink control channel candidates of a search space for a control resource set.

The LBT bandwidth monitoring component 725 may monitor one or more listen-before-talk bandwidths of the set of listen-before-talk bandwidths based on a set of blind hypotheses associated with the listen-before-talk bandwidths, where a total number of blind hypotheses in the set of blind hypotheses is equal to or greater than a total number of listen-before-talk bandwidths in the set of listen-before-talk bandwidths.

The transmitter 730 may transmit signals generated by other components of the device 705. In some examples, the transmitter 730 may be collocated with a receiver 710 in a transceiver module. For example, the transmitter 730 may be an example of aspects of the transceiver 920 described with reference to FIG. 9. The transmitter 730 may utilize a single antenna or a set of antennas.

Figure 8:
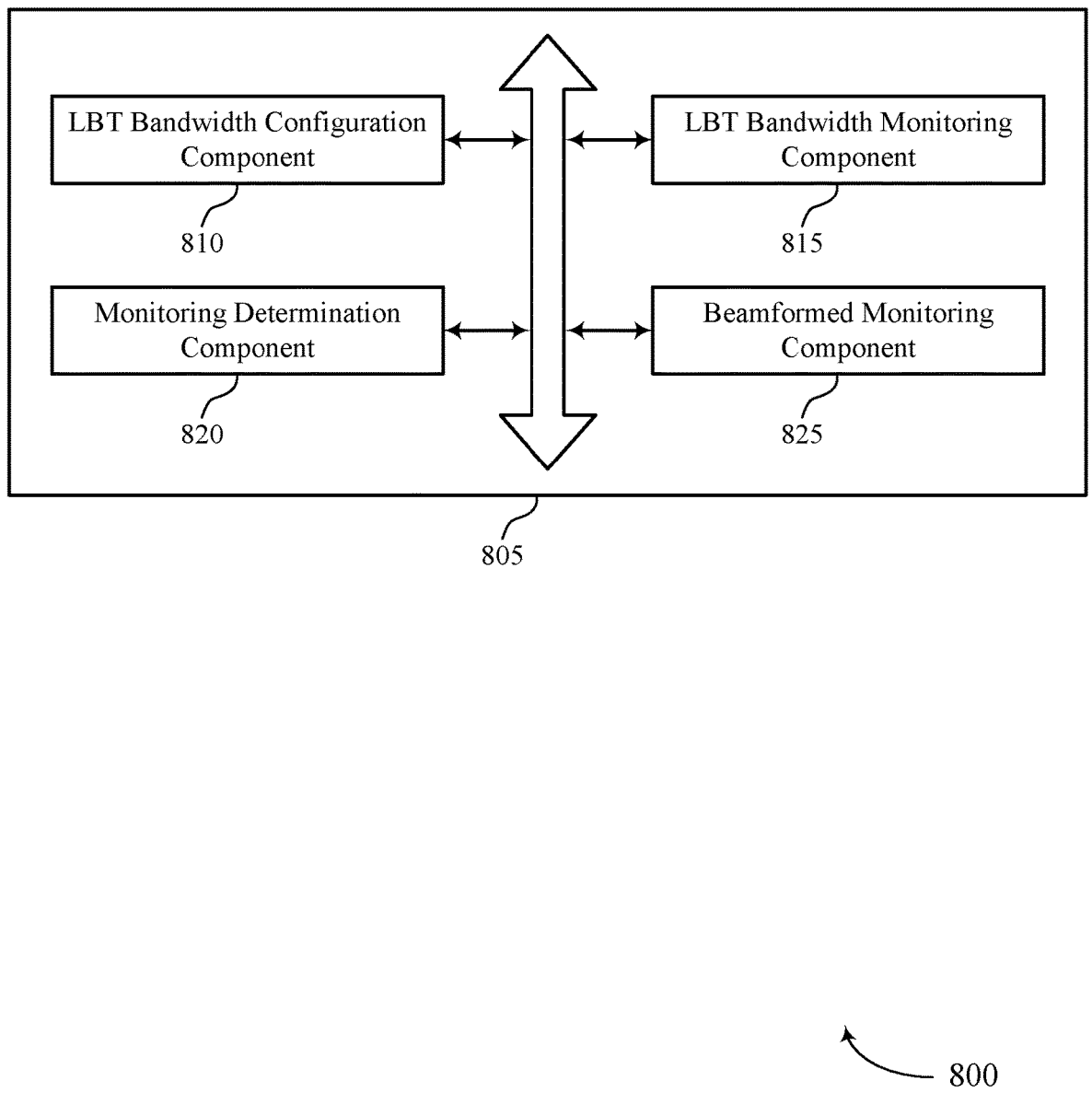
FIG. 8 shows a block diagram of a communications manager that supports wideband control signal transmission in accordance with aspects of the present disclosure.

FIG. 8 shows a block diagram 800 of a communications manager 805 that supports wideband control signal transmission in accordance with aspects of the present disclosure. The communications manager 805 may be an example of aspects of a communications manager 615, a communications manager 715, or a communications manager 910 described herein. The communications manager 805 may include a LBT bandwidth configuration component 810, a LBT bandwidth monitoring component 815, a monitoring determination component 820, and a beamformed monitoring component 825. Each of these modules may communicate, directly or indirectly, with one another (e.g., via one or more buses).

The LBT bandwidth configuration component 810 may receive, from a base station, a configuration for a set of listen-before-talk bandwidths, where each listen-before-talk bandwidth of the set of listen-before-talk bandwidths is associated with one or more downlink control channel candidates of a search space for a control resource set.

The LBT bandwidth monitoring component 815 may monitor one or more listen-before-talk bandwidths of the set of listen-before-talk bandwidths based on a set of blind hypotheses associated with the listen-before-talk bandwidths, where a total number of blind hypotheses in the set of blind hypotheses is equal to or greater than a total number of listen-before-talk bandwidths in the set of listen-before-talk bandwidths. In some examples, the LBT bandwidth monitoring component 815 may monitor the one or more listen before-talk bandwidths during a wakeup signal period for a wakeup signal from the base station.

In some examples, the LBT bandwidth monitoring component 815 may determine whether to wake up and monitor a DRX duration based on a detection of the wakeup signal.

In some examples, the LBT bandwidth monitoring component 815 may monitor, during a first monitoring occasion, a first subset of the set of listen-before-talk bandwidths based on a first subset of the set of blind hypotheses.

In some examples, the LBT bandwidth monitoring component 815 may monitor, during a second monitoring occasion, a second subset of the set of listen-before-talk bandwidths based on a second subset of the set of blind hypotheses.

In some examples, the LBT bandwidth monitoring component 815 may receive from the base station an indication of the first subset of the set of listen-before-talk bandwidths and the second subset of the set of listen-before-talk bandwidths.

In some examples, the LBT bandwidth monitoring component 815 may receive in connection with the configuration for the set of listen-before-talk bandwidths, a control resource set configuration including the indication of the first subset of the set of listen-before-talk bandwidths and the second subset of the set of listen-before-talk bandwidths.

In some examples, the LBT bandwidth monitoring component 815 may monitor for downlink control information from the base station. In some examples, the downlink control information may include the wakeup signal.

The monitoring determination component 820 may detect the wakeup signal based on the monitoring. In some examples, the monitoring determination component 820 may monitor for a downlink control channel signal during the DRX duration based on the detected wakeup signal. In some examples, the monitoring determination component 820 may determine the wakeup signal was not received during the wakeup signal period based on the monitoring. In some examples, the monitoring determination component 820 may remain in a low power state for the DRX duration.

The beamformed monitoring component 825 may monitor a first listen-before-talk bandwidth of the set of listen-before-talk bandwidths using a first beam. In some examples, the beamformed monitoring component 825 may monitor a second listen-before-talk bandwidth of the set of listen-before-talk bandwidths using a second beam. In some examples, the beamformed monitoring component 825 may receive from the base station a TCI for each listen-before-talk bandwidth of the set of listen-before-talk bandwidths. In some examples, the beamformed monitoring component 825 may determine the first beam and the second beam respectively based on the TCI received for each of the first listen-before-talk bandwidth and the second listen-before-talk bandwidth.

Figure 9:
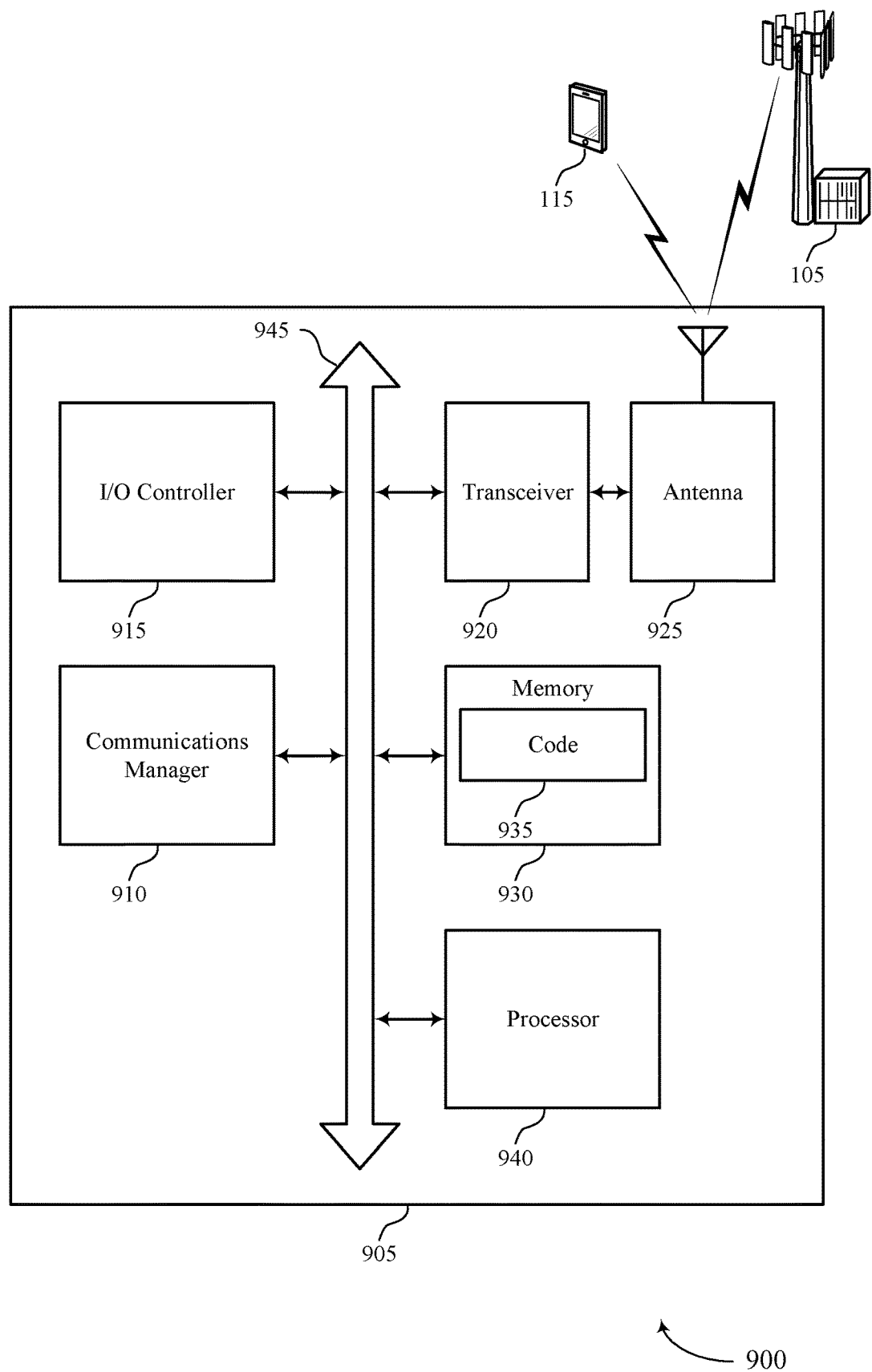
FIG. 9 shows a diagram of a system including a device that supports wideband control signal transmission in accordance with aspects of the present disclosure.

FIG. 9 shows a diagram of a system 900 including a device 905 that supports wideband control signal transmission in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive, from a base station, a configuration for a set of listen-before-talk bandwidths, where each listen-before-talk bandwidth of the set of listen-before-talk bandwidths is associated with one or more downlink control channel candidates of a search space for a control resource set and monitor one or more listen-before-talk bandwidths of the set of listen-before-talk bandwidths based on a set of blind hypotheses associated with the listen-before-talk bandwidths, where a total number of blind hypotheses in the set of blind hypotheses is equal to or greater than a total number of listen-before-talk bandwidths in the set of listen-before-talk bandwidths.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting wideband control signal transmission).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
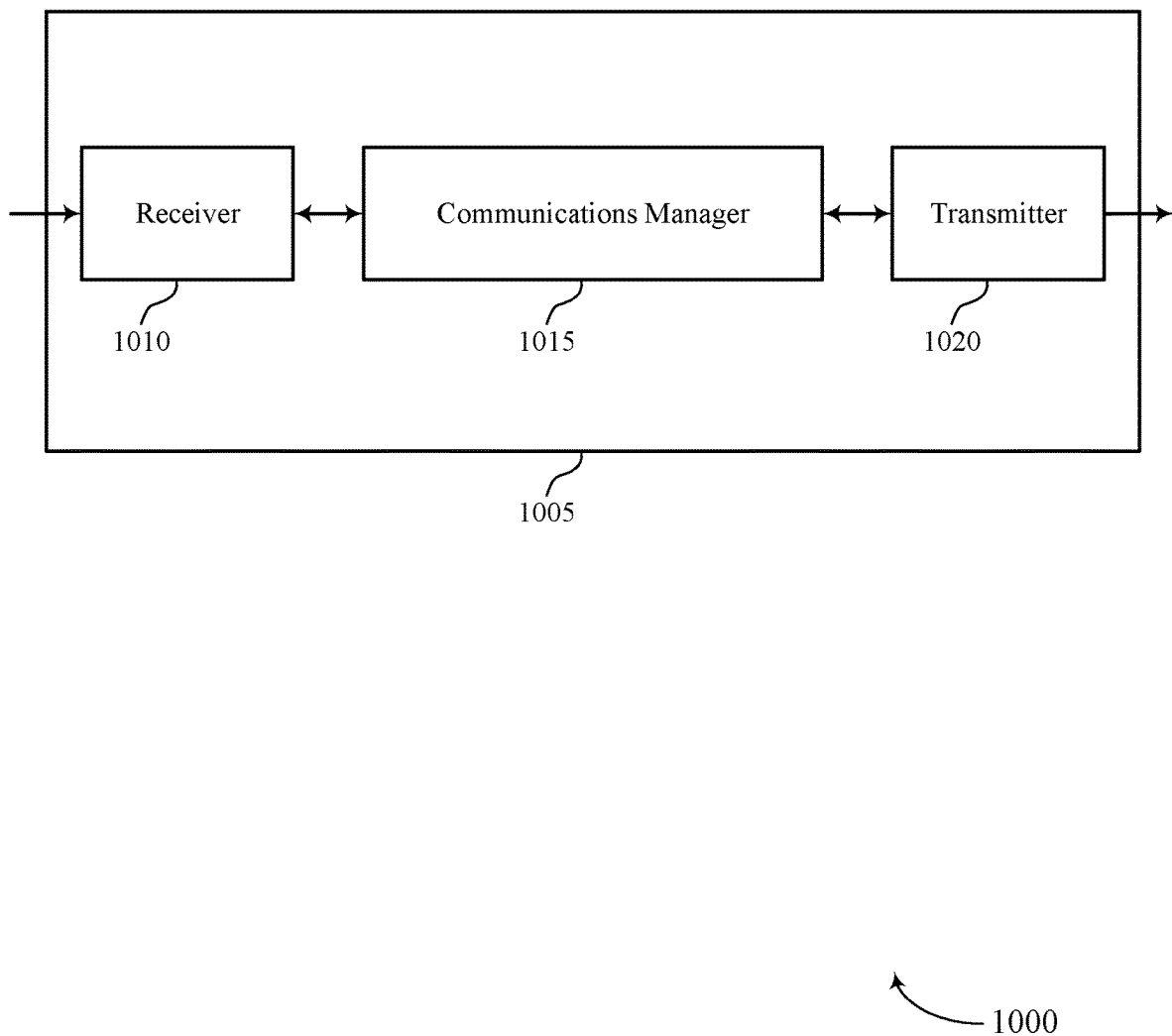
FIGS. 10 and 11 show block diagrams of devices that support wideband control signal transmission in accordance with aspects of the present disclosure.

FIG. 10 shows a block diagram 1000 of a device 1005 that supports wideband control signal transmission in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to wideband control signal transmission, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may transmit, to a UE, a configuration for a set of listen-before-talk bandwidths, where each listen-before-talk bandwidth of the set of listen-before-talk bandwidths is associated with one or more downlink control channel candidates of a search space for a control resource set and transmit, on a listen-before-talk bandwidth of the set of listen-before-talk bandwidths, downlink control information based on the UE being configured with a total number of blind hypotheses in the set of blind hypotheses that is equal to or greater than a total number of listen-before-talk bandwidths in the set of listen-before-talk bandwidths. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
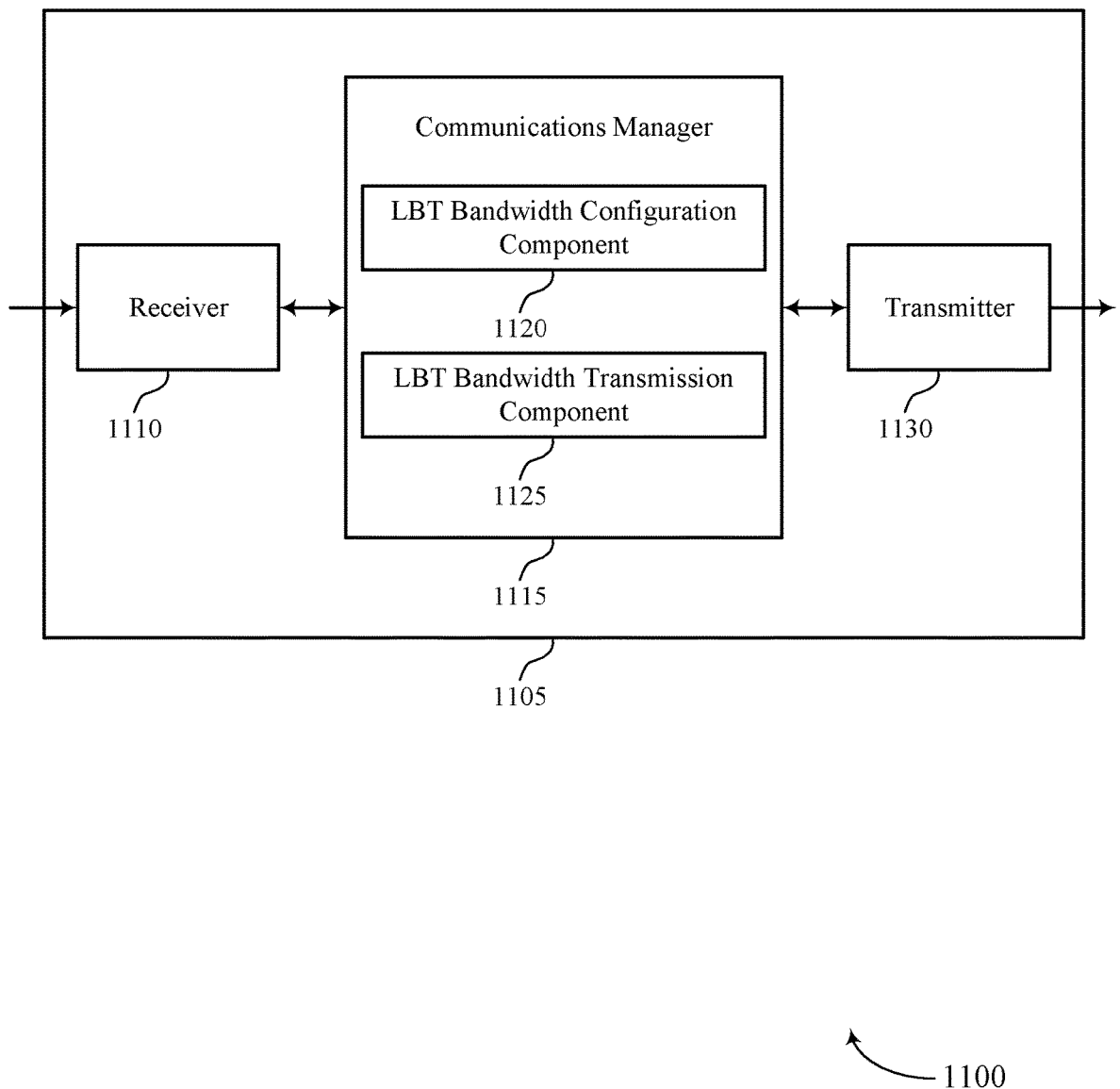

FIG. 11 shows a block diagram 1100 of a device 1105 that supports wideband control signal transmission in accordance with aspects of the present disclosure. The device 1105 may be an example of aspects of a device 1005, or a base station 105 as described herein. The device 1105 may include a receiver 1110, a communications manager 1115, and a transmitter 1130. The device 1105 may also include a processor. Each of these components may be in communication with one another (e.g., via one or more buses).

The receiver 1110 may receive information such as packets, user data, or control information associated with various information channels (e.g., control channels, data channels, and information related to wideband control signal transmission, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a LBT bandwidth configuration component 1120 and a LBT bandwidth transmission component 1125. The communications manager 1115 may be an example of aspects of the communications manager 1310 described herein.

The LBT bandwidth configuration component 1120 may transmit, to a UE, a configuration for a set of listen-before-talk bandwidths, where each listen-before-talk bandwidth of the set of listen-before-talk bandwidths is associated with one or more downlink control channel candidates of a search space for a control resource set.

The LBT bandwidth transmission component 1125 may transmit, on a listen-before-talk bandwidth of the set of listen-before-talk bandwidths, downlink control information based on the UE being configured with a total number of blind hypotheses in the set of blind hypotheses that is equal to or greater than a total number of listen-before-talk bandwidths in the set of listen-before-talk bandwidths.

The transmitter 1130 may transmit signals generated by other components of the device 1105. In some examples, the transmitter 1130 may be collocated with a receiver 1110 in a transceiver module. For example, the transmitter 1130 may be an example of aspects of the transceiver 1320 described with reference to FIG. 13. The transmitter 1130 may utilize a single antenna or a set of antennas.

Figure 12:
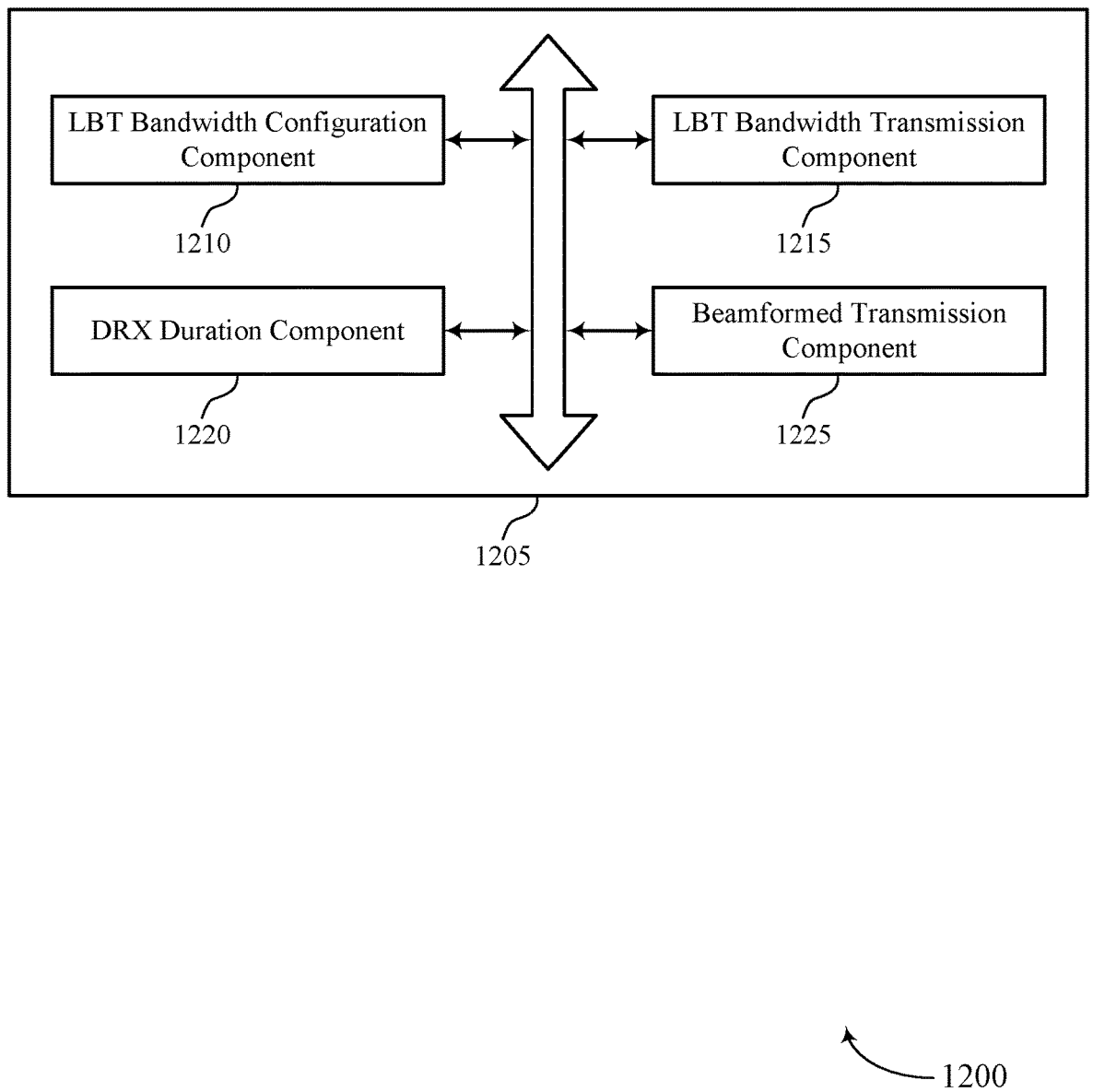
FIG. 12 shows a block diagram of a communications manager that supports wideband control signal transmission in accordance with aspects of the present disclosure.

FIG. 12 shows a block diagram 1200 of a communications manager 1205 that supports wideband control signal transmission in accordance with aspects of the present disclosure. The communications manager 1205 may be an example of aspects of a communications manager 1015, a communications manager 1115, or a communications manager 1310 described herein. The communications manager 1205 may include a LBT bandwidth configuration component 1210, a LBT bandwidth transmission component 1215, a DRX duration component 1220, and a beamformed transmission component 1225. Each of these modules may communicate, directly or indirectly, with one another (e.g., via one or more buses).

The LBT bandwidth configuration component 1210 may transmit, to a UE, a configuration for a set of listen-before-talk bandwidths, where each listen-before-talk bandwidth of the set of listen-before-talk bandwidths is associated with one or more downlink control channel candidates of a search space for a control resource set.

The LBT bandwidth transmission component 1215 may transmit, on a listen-before-talk bandwidth of the set of listen-before-talk bandwidths, downlink control information based on the UE being configured with a total number of blind hypotheses in the set of blind hypotheses that is equal to or greater than a total number of listen-before-talk bandwidths in the set of listen-before-talk bandwidths. In some examples, the LBT bandwidth transmission component 1215 may transmit a wakeup signal during a wakeup signal period of the UE.

In some examples, the LBT bandwidth transmission component 1215 may transmit the downlink control information during a first transmit occasion on the listen-before-talk bandwidth based on a first subset of listen-before-talk bandwidths of the set of listen-before-talk bandwidths including a first subset of downlink control channel candidates. In some examples, the LBT bandwidth transmission component 1215 may transmit the downlink control information during a second transmit occasion on the listen-before-talk bandwidth based on a second subset of listen-before-talk bandwidths of the set of listen-before-talk bandwidths including a second subset of downlink control channel candidates.

In some examples, the LBT bandwidth transmission component 1215 may transmit an indication of the first subset of the set of listen-before-talk bandwidths and the second subset of the set of listen-before-talk bandwidths. In some examples, the LBT bandwidth transmission component 1215 may transmit in connection with the configuration for the set of listen-before-talk bandwidths, a control resource set configuration including the indication of the first subset of the set of listen-before-talk bandwidths and the second subset of the set of listen-before-talk bandwidths. The DRX duration component 1220 may transmit to the UE on the one or more listen-before-talk bandwidths during a DRX duration based on transmitting the wakeup signal.

The beamformed transmission component 1225 may transmit the downlink control information using a beam associated with the listen-before-talk bandwidth. In some examples, the beamformed transmission component 1225 may transmit a corresponding TCI state for each listen-before-talk bandwidth of the set of listen-before-talk bandwidths, where each listen-before-talk bandwidth of the set of listen-before-talk bandwidths is associated with a corresponding beam based on the corresponding TCI state.

Figure 13:
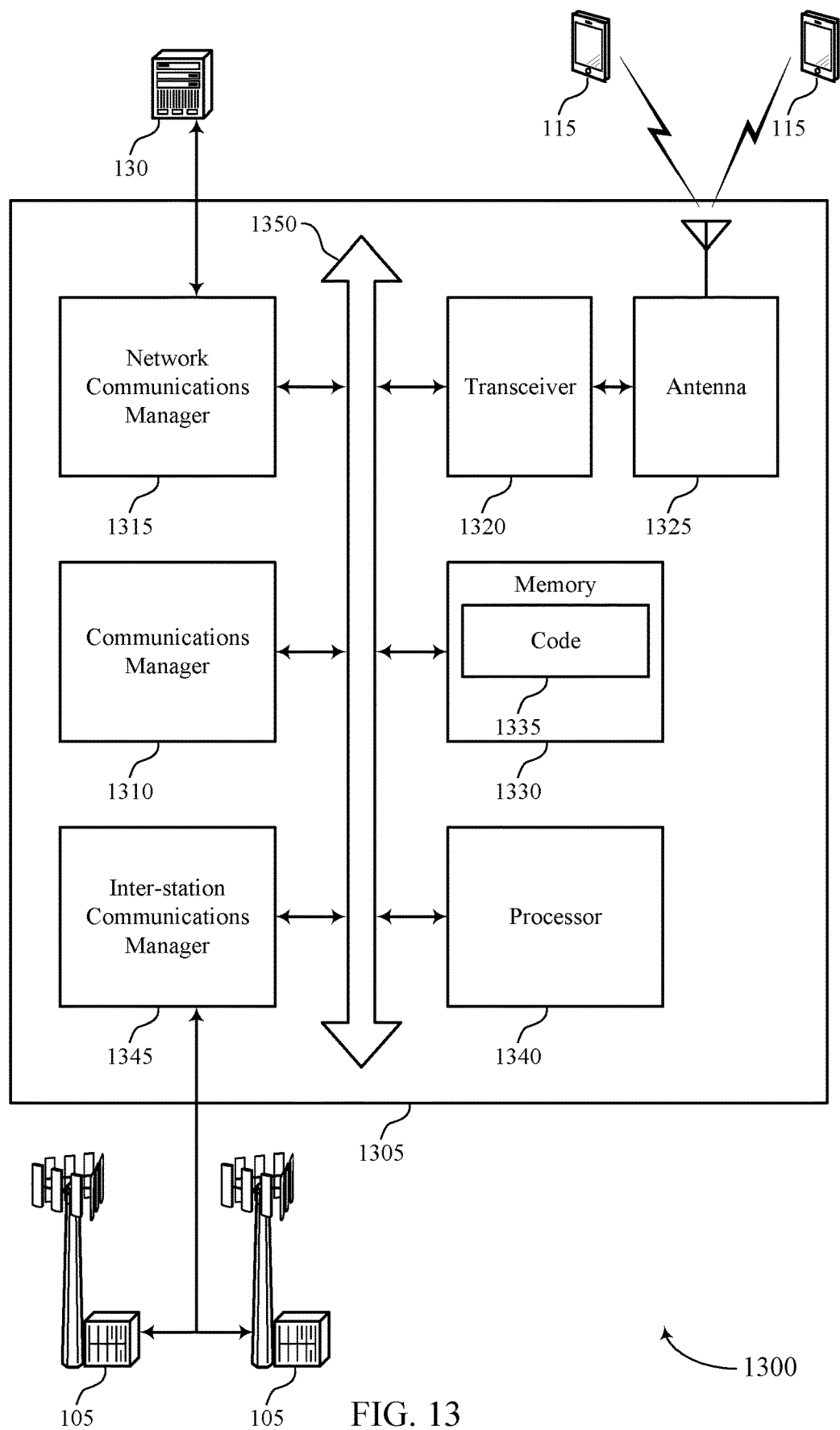
FIG. 13 shows a diagram of a system including a device that supports wideband control signal transmission in accordance with aspects of the present disclosure.

FIG. 13 shows a diagram of a system 1300 including a device 1305 that supports wideband control signal transmission in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may transmit, to a UE, a configuration for a set of listen-before-talk bandwidths, where each listen-before-talk bandwidth of the set of listen-before-talk bandwidths is associated with one or more downlink control channel candidates of a search space for a control resource set and transmit, on a listen-before-talk bandwidth of the set of listen-before-talk bandwidths, downlink control information based on the UE being configured with a total number of blind hypotheses in the set of blind hypotheses that is equal to or greater than a total number of listen-before-talk bandwidths in the set of listen-before-talk bandwidths.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting wideband control signal transmission).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
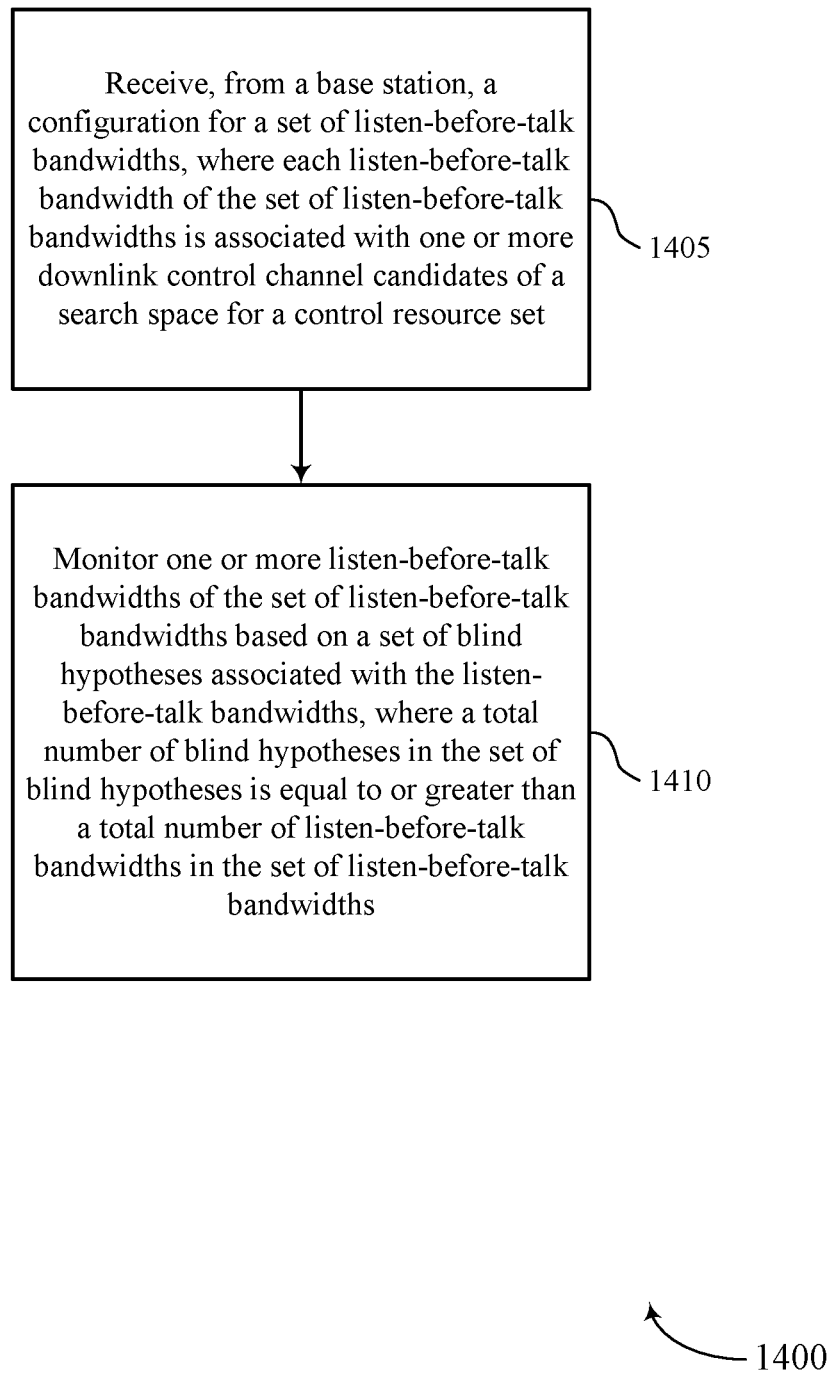
FIGS. 14 through 19 show flowcharts illustrating methods that support wideband control signal transmission in accordance with aspects of the present disclosure.

FIG. 14 shows a flowchart illustrating a method 1400 that supports wideband control signal transmission in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may receive, from a base station, a configuration for a set of listen-before-talk bandwidths, where each listen-before-talk bandwidth of the set of listen-before-talk bandwidths is associated with one or more downlink control channel candidates of a search space for a control resource set. The operations of 1405 may be performed according to the methods described herein. In some examples, aspects of the operations of 1405 may be performed by an LBT bandwidth configuration component as described with reference to FIGS. 6 through 9.

At 1410, the UE may monitor one or more listen-before-talk bandwidths of the set of listen-before-talk bandwidths based on a set of blind hypotheses associated with the listen-before-talk bandwidths, where a total number of blind hypotheses in the set of blind hypotheses is equal to or greater than a total number of listen-before-talk bandwidths in the set of listen-before-talk bandwidths. The operations of 1410 may be performed according to the methods described herein. In some examples, aspects of the operations of 1410 may be performed by an LBT bandwidth monitoring component as described with reference to FIGS. 6 through 9.

Figure 15:
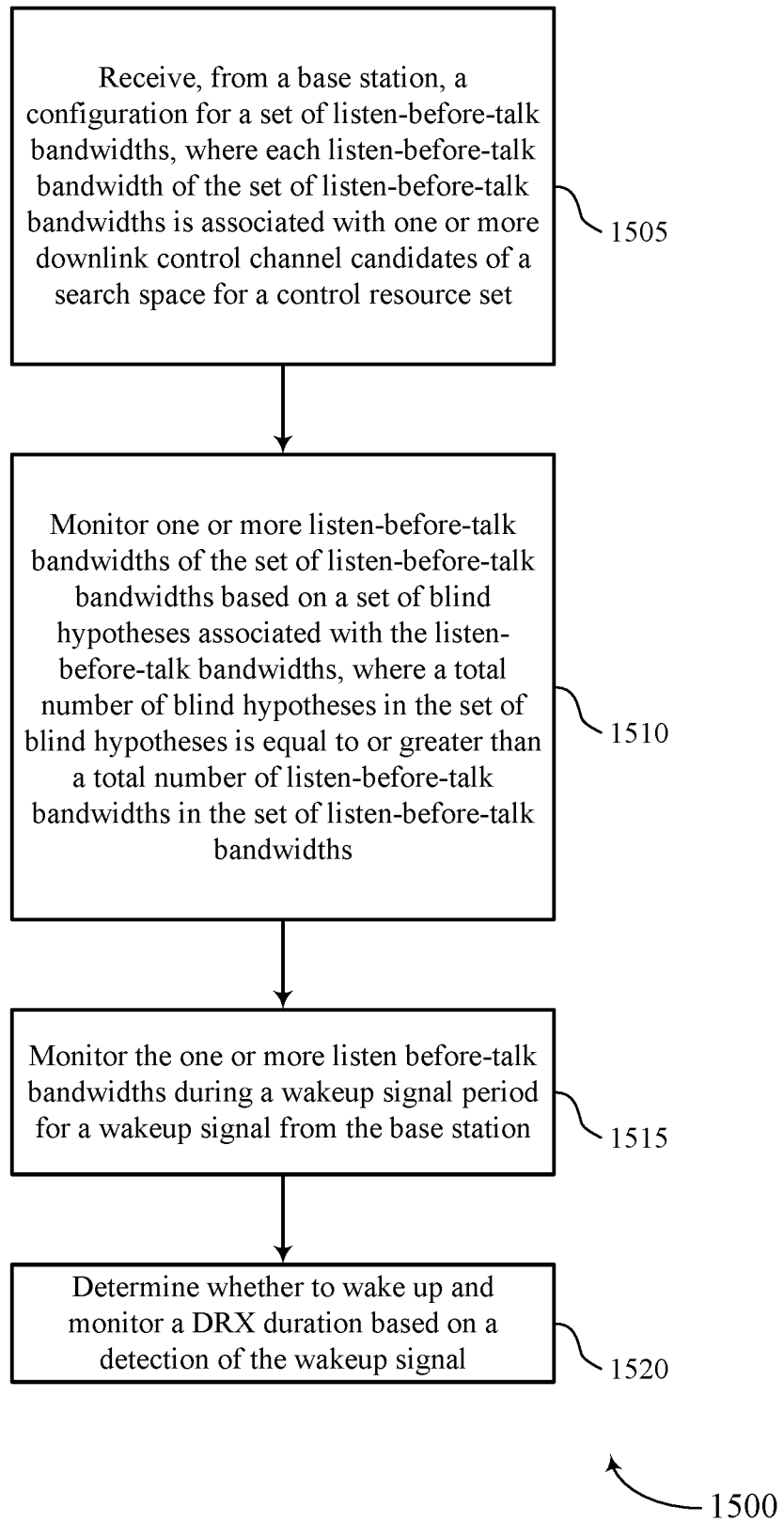

FIG. 15 shows a flowchart illustrating a method 1500 that supports wideband control signal transmission in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may receive, from a base station, a configuration for a set of listen-before-talk bandwidths, where each listen-before-talk bandwidth of the set of listen-before-talk bandwidths is associated with one or more downlink control channel candidates of a search space for a control resource set. The operations of 1505 may be performed according to the methods described herein. In some examples, aspects of the operations of 1505 may be performed by an LBT bandwidth configuration component as described with reference to FIGS. 6 through 9.

At 1510, the UE may monitor one or more listen-before-talk bandwidths of the set of listen-before-talk bandwidths based on a set of blind hypotheses associated with the listen-before-talk bandwidths, where a total number of blind hypotheses in the set of blind hypotheses is equal to or greater than a total number of listen-before-talk bandwidths in the set of listen-before-talk bandwidths. The operations of 1510 may be performed according to the methods described herein. In some examples, aspects of the operations of 1510 may be performed by an LBT bandwidth monitoring component as described with reference to FIGS. 6 through 9.

At 1515, the UE may monitor the one or more listen before-talk bandwidths during a wakeup signal period for a wakeup signal from the base station. The operations of 1515 may be performed according to the methods described herein. In some examples, aspects of the operations of 1515 may be performed by an LBT bandwidth monitoring component as described with reference to FIGS. 6 through 9.

At 1520, the UE may determine whether to wake up and monitor a DRX duration based on a detection of the wakeup signal. The operations of 1520 may be performed according to the methods described herein. In some examples, aspects of the operations of 1520 may be performed by an LBT bandwidth monitoring component as described with reference to FIGS. 6 through 9.

Figure 16:
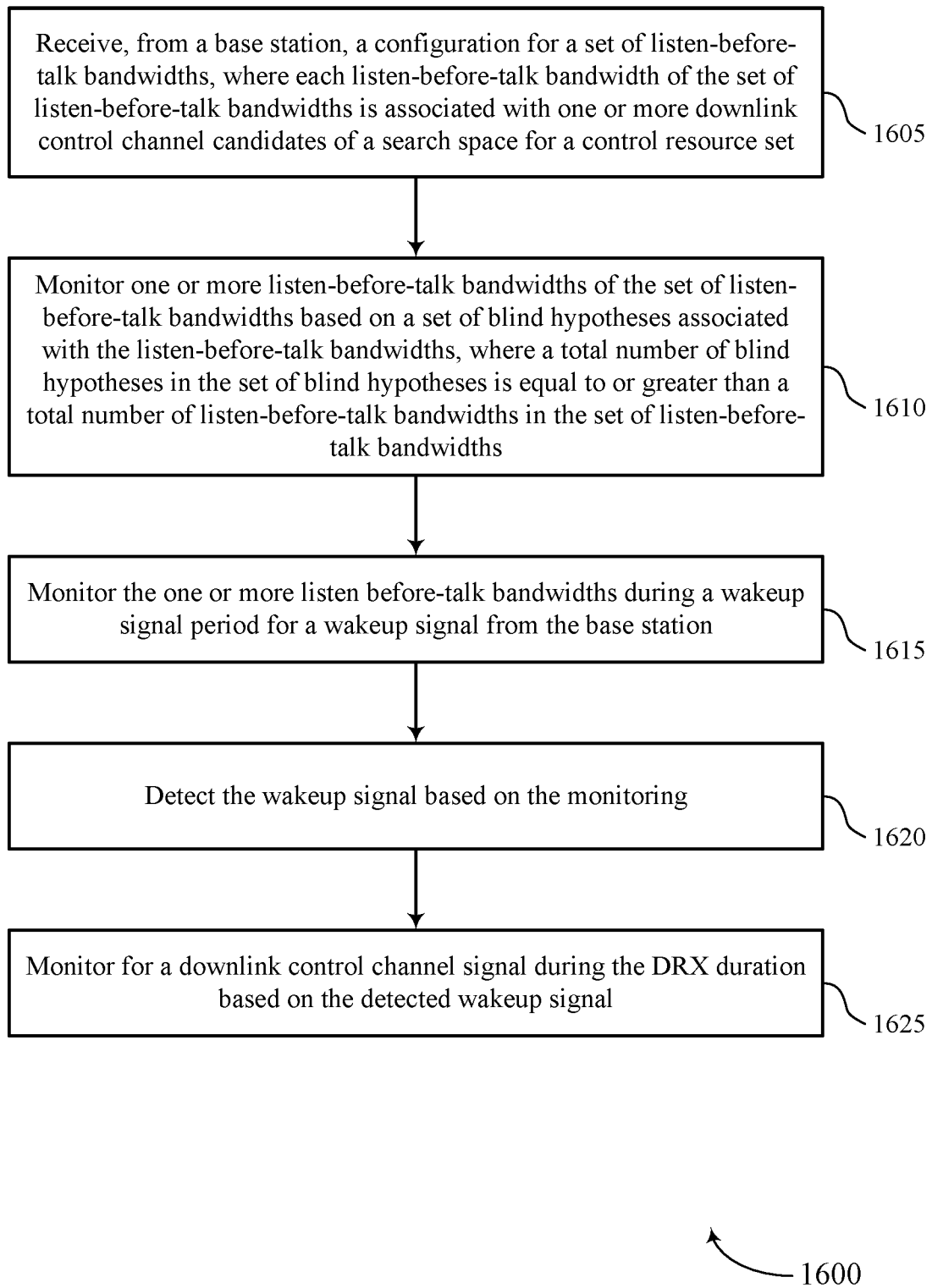

FIG. 16 shows a flowchart illustrating a method 1600 that supports wideband control signal transmission in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may receive, from a base station, a configuration for a set of listen-before-talk bandwidths, where each listen-before-talk bandwidth of the set of listen-before-talk bandwidths is associated with one or more downlink control channel candidates of a search space for a control resource set. The operations of 1605 may be performed according to the methods described herein. In some examples, aspects of the operations of 1605 may be performed by an LBT bandwidth configuration component as described with reference to FIGS. 6 through 9.

At 1610, the UE may monitor one or more listen-before-talk bandwidths of the set of listen-before-talk bandwidths based on a set of blind hypotheses associated with the listen-before-talk bandwidths, where a total number of blind hypotheses in the set of blind hypotheses is equal to or greater than a total number of listen-before-talk bandwidths in the set of listen-before-talk bandwidths. The operations of 1610 may be performed according to the methods described herein. In some examples, aspects of the operations of 1610 may be performed by an LBT bandwidth monitoring component as described with reference to FIGS. 6 through 9.

At 1615, the UE may monitor the one or more listen before-talk bandwidths during a wakeup signal period for a wakeup signal from the base station. The operations of 1615 may be performed according to the methods described herein. In some examples, aspects of the operations of 1615 may be performed by an LBT bandwidth monitoring component as described with reference to FIGS. 6 through 9.

At 1620, the UE may detect the wakeup signal based on the monitoring. The operations of 1620 may be performed according to the methods described herein. In some examples, aspects of the operations of 1620 may be performed by a monitoring determination component as described with reference to FIGS. 6 through 9.

At 1625, the UE may monitor for a downlink control channel signal during the DRX duration based on the detected wakeup signal. The operations of 1625 may be performed according to the methods described herein. In some examples, aspects of the operations of 1625 may be performed by a monitoring determination component as described with reference to FIGS. 6 through 9.

Figure 17:
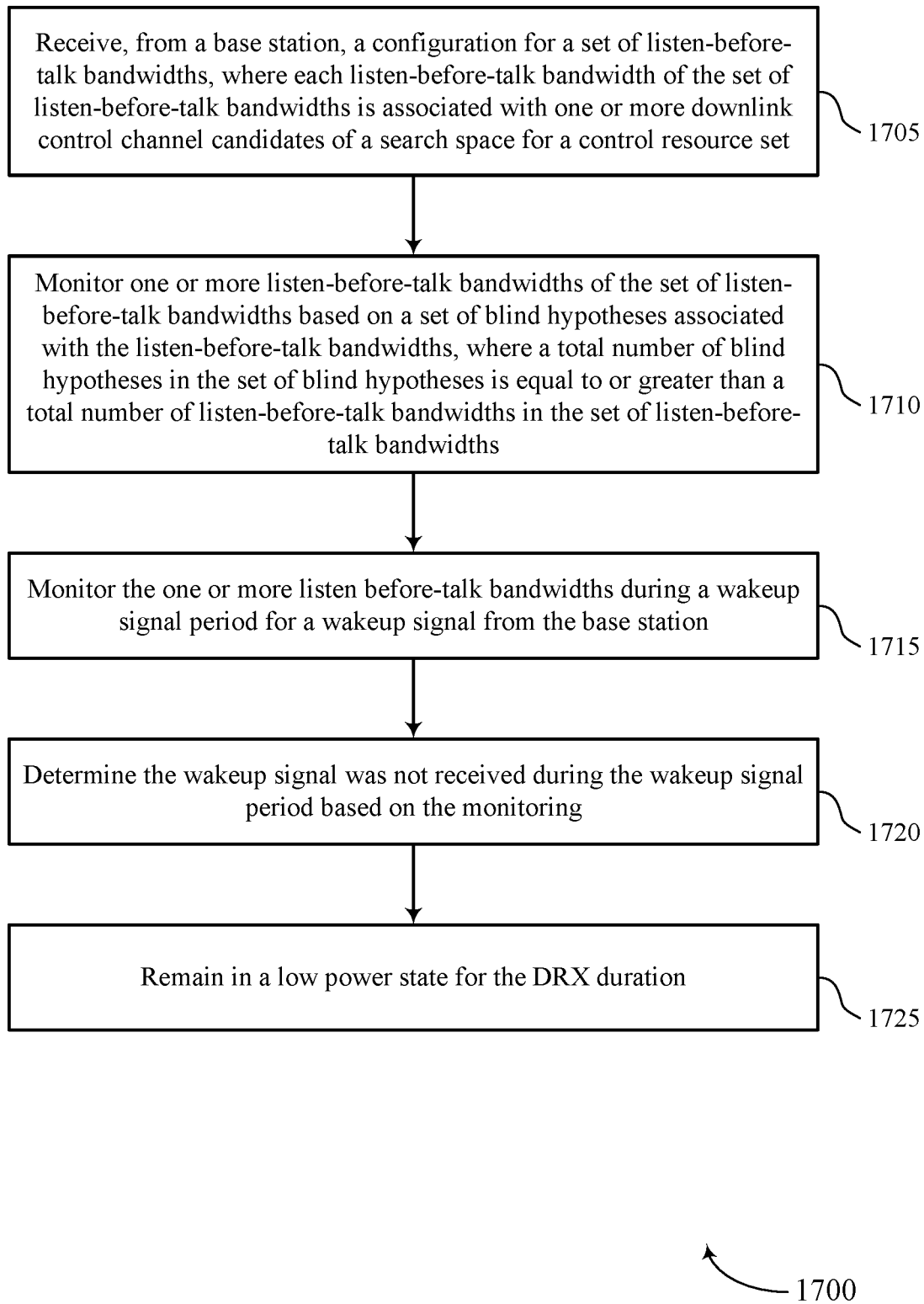

FIG. 17 shows a flowchart illustrating a method 1700 that supports wideband control signal transmission in accordance with aspects of the present disclosure. The operations of method 1700 may be implemented by a UE 115 or its components as described herein. For example, the operations of method 1700 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1705, the UE may receive, from a base station, a configuration for a set of listen-before-talk bandwidths, where each listen-before-talk bandwidth of the set of listen-before-talk bandwidths is associated with one or more downlink control channel candidates of a search space for a control resource set. The operations of 1705 may be performed according to the methods described herein. In some examples, aspects of the operations of 1705 may be performed by an LBT bandwidth configuration component as described with reference to FIGS. 6 through 9.

At 1710, the UE may monitor one or more listen-before-talk bandwidths of the set of listen-before-talk bandwidths based on a set of blind hypotheses associated with the listen-before-talk bandwidths, where a total number of blind hypotheses in the set of blind hypotheses is equal to or greater than a total number of listen-before-talk bandwidths in the set of listen-before-talk bandwidths. The operations of 1710 may be performed according to the methods described herein. In some examples, aspects of the operations of 1710 may be performed by an LBT bandwidth monitoring component as described with reference to FIGS. 6 through 9.

At 1715, the UE may monitor the one or more listen before-talk bandwidths during a wakeup signal period for a wakeup signal from the base station. The operations of 1715 may be performed according to the methods described herein. In some examples, aspects of the operations of 1715 may be performed by an LBT bandwidth monitoring component as described with reference to FIGS. 6 through 9.

At 1720, the UE may determine the wakeup signal was not received during the wakeup signal period based on the monitoring. The operations of 1720 may be performed according to the methods described herein. In some examples, aspects of the operations of 1720 may be performed by a monitoring determination component as described with reference to FIGS. 6 through 9.

At 1725, the UE may remain in a low power state for the DRX duration. The operations of 1725 may be performed according to the methods described herein. In some examples, aspects of the operations of 1725 may be performed by a monitoring determination component as described with reference to FIGS. 6 through 9.

Figure 18:
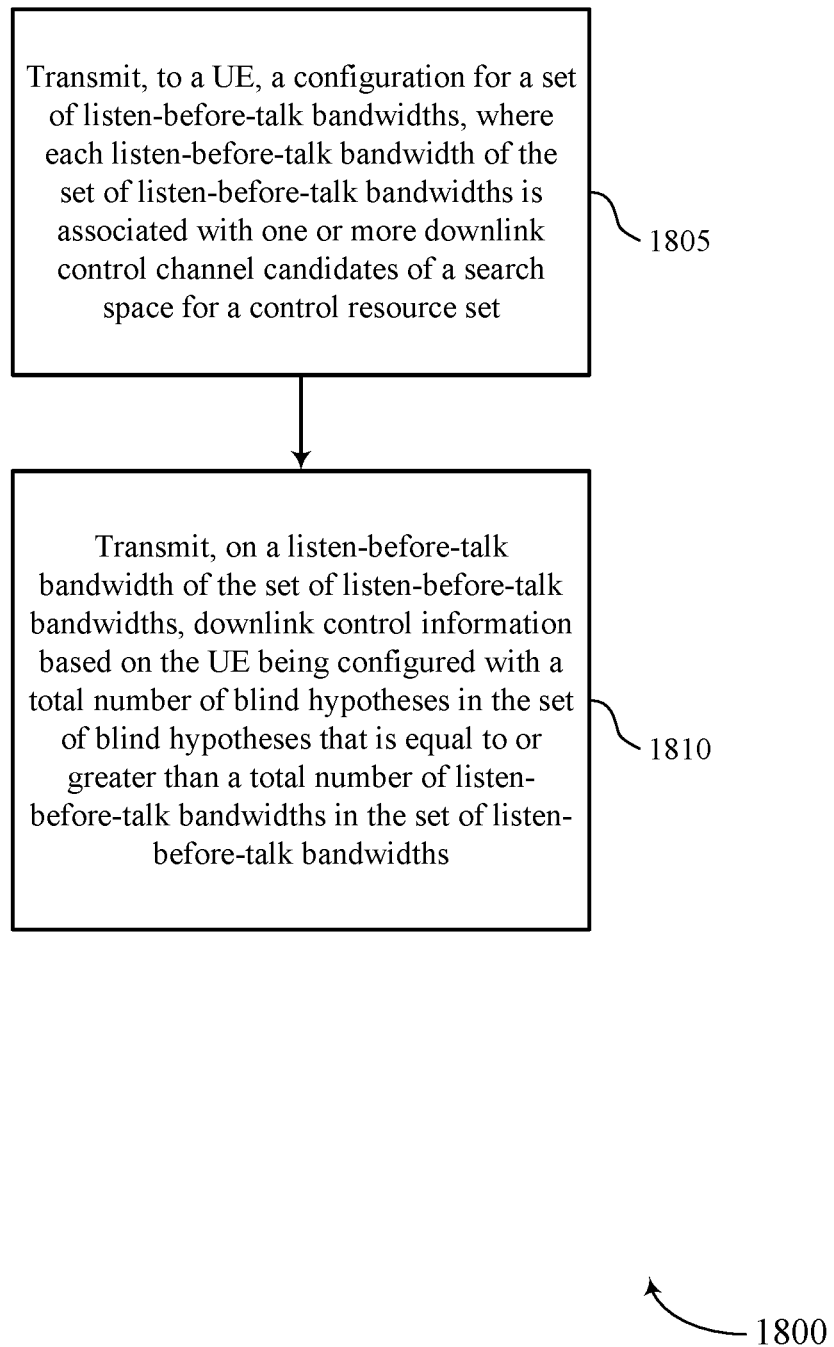

FIG. 18 shows a flowchart illustrating a method 1800 that supports wideband control signal transmission in accordance with aspects of the present disclosure. The operations of method 1800 may be implemented by a base station 105 or its components as described herein. For example, the operations of method 1800 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1805, the base station may transmit, to a UE, a configuration for a set of listen-before-talk bandwidths, where each listen-before-talk bandwidth of the set of listen-before-talk bandwidths is associated with one or more downlink control channel candidates of a search space for a control resource set. The operations of 1805 may be performed according to the methods described herein. In some examples, aspects of the operations of 1805 may be performed by an LBT bandwidth configuration component as described with reference to FIGS. 10 through 13.

At 1810, the base station may transmit, on a listen-before-talk bandwidth of the set of listen-before-talk bandwidths, downlink control information based on the UE being configured with a total number of blind hypotheses in the set of blind hypotheses that is equal to or greater than a total number of listen-before-talk bandwidths in the set of listen-before-talk bandwidths. The operations of 1810 may be performed according to the methods described herein. In some examples, aspects of the operations of 1810 may be performed by an LBT bandwidth transmission component as described with reference to FIGS. 10 through 13.

Figure 19:
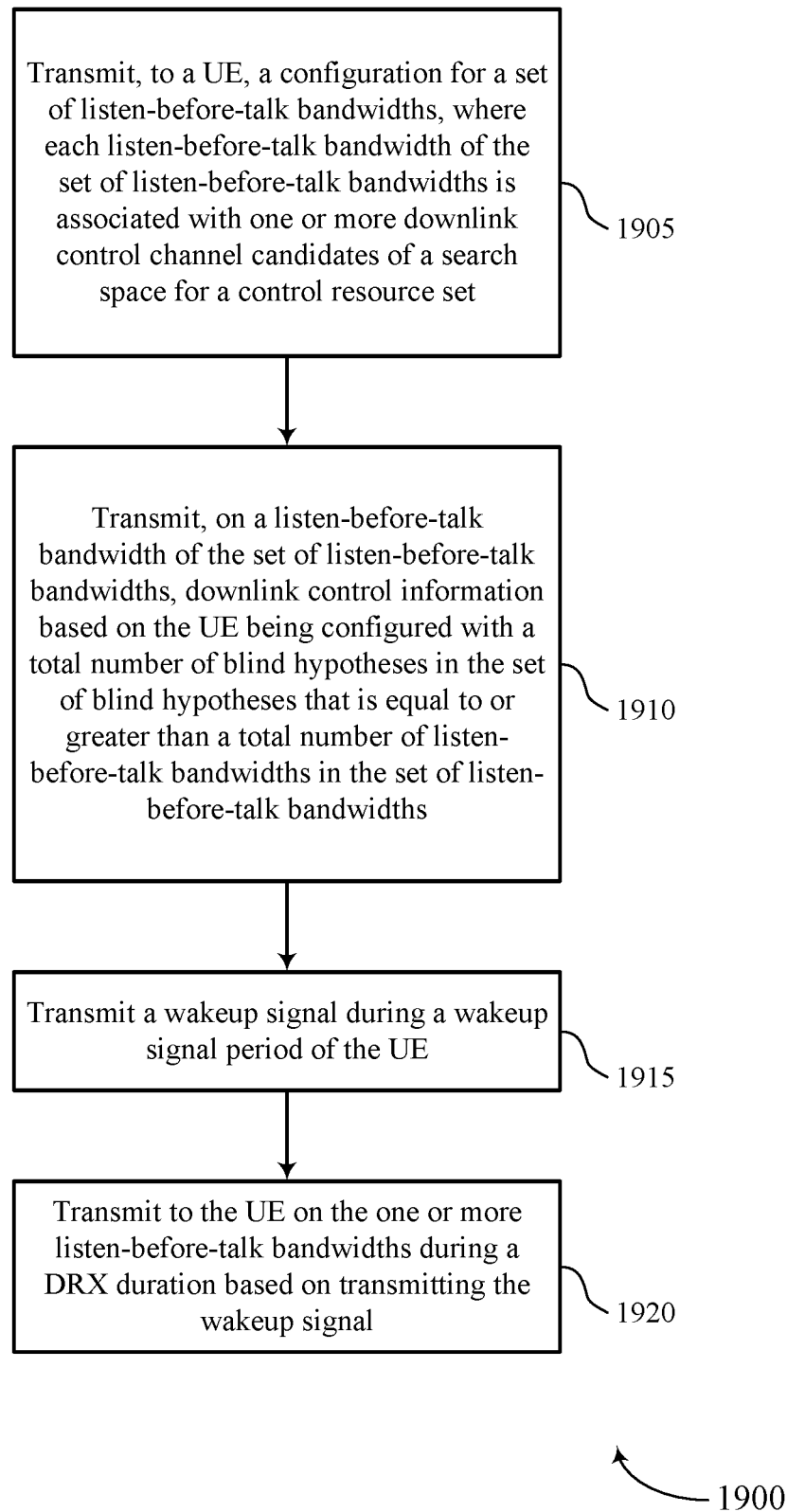

FIG. 19 shows a flowchart illustrating a method 1900 that supports wideband control signal transmission in accordance with aspects of the present disclosure. The operations of method 1900 may be implemented by a base station 105 or its components as described herein. For example, the operations of method 1900 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1905, the base station may transmit, to a UE, a configuration for a set of listen-before-talk bandwidths, where each listen-before-talk bandwidth of the set of listen-before-talk bandwidths is associated with one or more downlink control channel candidates of a search space for a control resource set. The operations of 1905 may be performed according to the methods described herein. In some examples, aspects of the operations of 1905 may be performed by an LBT bandwidth configuration component as described with reference to FIGS. 10 through 13.

At 1910, the base station may transmit, on a listen-before-talk bandwidth of the set of listen-before-talk bandwidths, downlink control information based on the UE being configured with a total number of blind hypotheses in the set of blind hypotheses that is equal to or greater than a total number of listen-before-talk bandwidths in the set of listen-before-talk bandwidths. The operations of 1910 may be performed according to the methods described herein. In some examples, aspects of the operations of 1910 may be performed by an LBT bandwidth transmission component as described with reference to FIGS. 10 through 13.

At 1915, the base station may transmit a wakeup signal during a wakeup signal period of the UE. The operations of 1915 may be performed according to the methods described herein. In some examples, aspects of the operations of 1915 may be performed by an LBT bandwidth transmission component as described with reference to FIGS. 10 through 13.

At 1920, the base station may transmit to the UE on the one or more listen-before-talk bandwidths during a DRX duration based on transmitting the wakeup signal. The operations of 1920 may be performed according to the methods described herein. In some examples, aspects of the operations of 1920 may be performed by a DRX duration component as described with reference to FIGS. 10 through 13.

Aspect 1: A method for wireless communications at a UE, comprising: receiving, from a base station, a configuration for a plurality of listen-before-talk bandwidths, wherein each listen-before-talk bandwidth of the plurality of listen-before-talk bandwidths is associated with one or more downlink control channel candidates of a search space for a control resource set; and monitoring one or more listen-before-talk bandwidths of the plurality of listen-before-talk bandwidths based at least in part on a set of blind hypotheses associated with the listen-before-talk bandwidths, wherein a total number of blind hypotheses in the set of blind hypotheses is equal to or greater than a total number of listen-before-talk bandwidths in the plurality of listen-before-talk bandwidths.

Aspect 2: The method of aspect 1, wherein monitoring one or more of the plurality of listen-before-talk bandwidths comprises: monitoring the one or more listen before-talk bandwidths during a wakeup signal period for a wakeup signal from the base station; and determining whether to wake up and monitor a DRX duration based at least in part on a detection of the wakeup signal.

Aspect 3: The method of aspect 2, wherein detecting the wakeup signal based at least in part on the monitoring; and monitoring for a downlink control channel signal during the DRX duration based at least in part on the detected wakeup signal.

Aspect 4: The method of any of aspects 1 or 2, wherein determining the wakeup signal was not received during the wakeup signal period based at least in part on the monitoring; and remaining in a low power state for the DRX duration.

Aspect 5: The method of any of aspects 1 through 4, wherein monitoring one or more of the plurality of listen-before-talk bandwidths comprises: monitoring, during a first monitoring occasion, a first subset of the plurality of listen-before-talk bandwidths based at least in part on a first subset of the set of blind hypotheses; and monitoring, during a second monitoring occasion, a second subset of the plurality of listen-before-talk bandwidths based at least in part on a second subset of the set of blind hypotheses.

Aspect 6: The method of aspect 5, further comprising: receiving from the base station an indication of the first subset of the plurality of listen-before-talk bandwidths and the second subset of the plurality of listen-before-talk bandwidths.

Aspect 7: The method of aspect 6, wherein receiving the indication of the first subset of the plurality of listen-before-talk bandwidths and the second subset of the plurality of listen-before-talk bandwidths comprises: receiving in connection with the configuration for the plurality of listen-before-talk bandwidths, a control resource set configuration comprising the indication of the first subset of the plurality of listen-before-talk bandwidths and the second subset of the plurality of listen-before-talk bandwidths.

Aspect 8: The method of any of aspects 1 through 7, wherein monitoring one or more of the plurality of listen-before-talk bandwidths comprises: monitoring a first listen-before-talk bandwidth of the plurality of listen-before-talk bandwidths using a first beam; and monitoring a second listen-before-talk bandwidth of the plurality of listen-before-talk bandwidths using a second beam.

Aspect 9: The method of aspect 8, wherein monitoring one or more of the plurality of listen-before-talk bandwidths comprises: receiving from the base station a TCI for each listen-before-talk bandwidth of the plurality of listen-before-talk bandwidths; and determining the first beam and the second beam respectively based at least in part on the TCI received for each of the first listen-before-talk bandwidth and the second listen-before-talk bandwidth.

Aspect 10: The method of any of aspects 1 through 9, further comprising: monitoring for downlink control information from the base station.

Aspect 11: A method for wireless communications at a base station, comprising: transmitting, to a UE, a configuration for a plurality of listen-before-talk bandwidths, wherein each listen-before-talk bandwidth of the plurality of listen-before-talk bandwidths is associated with one or more downlink control channel candidates of a search space for a control resource set; and transmitting, on a listen-before-talk bandwidth of the plurality of listen-before-talk bandwidths, downlink control information based at least in part on the UE being configured with a total number of blind hypotheses in a set of blind hypotheses that is equal to or greater than a total number of listen-before-talk bandwidths in the plurality of listen-before-talk bandwidths.

Aspect 12: The method of aspect 11, wherein transmitting the downlink control information further comprises: transmitting a wakeup signal during a wakeup signal period of the UE; and transmitting to the UE on the listen-before-talk bandwidth during a DRX duration based at least in part on transmitting the wakeup signal.

Aspect 13: The method of any of aspects 11 through 12, wherein transmitting the downlink control information further comprises: transmitting the downlink control information during a first transmit occasion on the listen-before-talk bandwidth based at least in part on a first subset of listen-before-talk bandwidths of the plurality of listen-before-talk bandwidths comprising a first subset of downlink control channel candidates; or transmitting the downlink control information during a second transmit occasion on the listen-before-talk bandwidth based at least in part on a second subset of listen-before-talk bandwidths of the plurality of listen-before-talk bandwidths comprising a second subset of downlink control channel candidates.

Aspect 14: The method of aspect 13, further comprising: transmitting an indication of the first subset of the plurality of listen-before-talk bandwidths and the second subset of the plurality of listen-before-talk bandwidths.

Aspect 15: The method of aspect 14, wherein transmitting the indication of the first subset of the plurality of listen-before-talk bandwidths and the second subset of the plurality of listen-before-talk bandwidths comprises: transmitting in connection with the configuration for the plurality of listen-before-talk bandwidths, a control resource set configuration comprising the indication of the first subset of the plurality of listen-before-talk bandwidths and the second subset of the plurality of listen-before-talk bandwidths.

Aspect 16: The method of any of aspects 11 through 15, wherein transmitting the downlink control information further comprises: transmitting the downlink control information using a beam associated with the listen-before-talk bandwidth.

Aspect 17: The method of aspect 16, further comprising: transmitting a corresponding TCI state for each listen-before-talk bandwidth of the plurality of listen-before-talk bandwidths, wherein each listen-before-talk bandwidth of the plurality of listen-before-talk bandwidths is associated with a corresponding beam based at least in part on the corresponding TCI state.

Aspect 18: An apparatus for wireless communications at a UE, comprising a processor; memory coupled with the processor; and instructions stored in the memory and executable by the processor to cause the apparatus to perform a method of any of aspects 1 through 10.

Aspect 19: An apparatus for wireless communications at a UE, comprising at least one means for performing a method of any of aspects 1 through 10.

Aspect 20: A non-transitory computer-readable medium storing code for wireless communications at a UE, the code comprising instructions executable by a processor to perform a method of any of aspects 1 through 10.

Aspect 21: An apparatus for wireless communications at a base station, comprising a processor; memory coupled with the processor; and instructions stored in the memory and executable by the processor to cause the apparatus to perform a method of any of aspects 11 through 17.

Aspect 22: An apparatus for wireless communications at a base station, comprising at least one means for performing a method of any of aspects 11 through 17.

Aspect 23: A non-transitory computer-readable medium storing code for wireless communications at a base station, the code comprising instructions executable by a processor to perform a method of any of aspects 11 through 17.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   receiving, from a network device, a configuration for a plurality of listen-before-talk bandwidths, wherein each listen-before-talk bandwidth of the plurality of listen-before-talk bandwidths is associated with one or more downlink control channel candidates of a search space for a control resource set; and
   monitoring, during a first monitoring occasion associated with a first discontinuous reception (DRX) cycle, a first subset of listen-before-talk bandwidths of the plurality of listen-before-talk bandwidths and, during a second monitoring occasion associated with a second DRX cycle, a second subset of listen-before-talk bandwidths of the plurality of listen-before-talk bandwidths based at least in part on a set of blind hypotheses associated with the listen-before-talk bandwidths, wherein a total number of blind hypotheses in the set of blind hypotheses is equal to or greater than a total number of listen-before-talk bandwidths in the plurality of listen-before-talk bandwidths.

2. The method of claim 1, wherein monitoring the first subset of the plurality of listen-before-talk bandwidths comprises:
   monitoring the first subset of listen-before-talk bandwidths during a wakeup signal period for a wakeup signal from the network device; and
   determining whether to wake up and monitor a DRX duration of the first DRX cycle based at least in part on a detection of the wakeup signal.

3. The method of claim 2, wherein:
   detecting the wakeup signal based at least in part on the monitoring; and
   monitoring for a downlink control channel signal during the DRX duration based at least in part on the detected wakeup signal.

4. The method of claim 2, wherein:
   determining the wakeup signal was not received during the wakeup signal period based at least in part on the monitoring; and
   remaining in a low power state for the DRX duration.

5. The method of claim 1, wherein monitoring the first subset of the plurality of listen-before-talk bandwidths is based at least in part on a first subset of the set of blind hypotheses and monitoring the second subset of the plurality of listen-before-talk bandwidths is based at least in part on a second subset of the set of blind hypotheses.

6. The method of claim 1, further comprising:
   receiving from the network device an indication of the first subset of the plurality of listen-before-talk bandwidths and the second subset of the plurality of listen-before-talk bandwidths.

7. The method of claim 6, wherein receiving the indication of the first subset of the plurality of listen-before-talk bandwidths and the second subset of the plurality of listen-before-talk bandwidths comprises:
   receiving in connection with the configuration for the plurality of listen-before-talk bandwidths, a control resource set configuration comprising the indication of the first subset of the plurality of listen-before-talk bandwidths and the second subset of the plurality of listen-before-talk bandwidths.

8. The method of claim 1, wherein monitoring the first subset of listen-before-talk bandwidths comprises:
   monitoring a first listen-before-talk bandwidth of the plurality of listen-before-talk bandwidths using a first beam; and
   monitoring a second listen-before-talk bandwidth of the plurality of listen-before-talk bandwidths using a second beam.

9. The method of claim 8, further comprising:
   receiving from the network device a transmission configuration indicator (TCI) for each listen-before-talk bandwidth of the plurality of listen-before-talk bandwidths; and
   determining the first beam and the second beam respectively based at least in part on the TCI received for each of the first listen-before-talk bandwidth and the second listen-before-talk bandwidth.

10. The method of claim 1, further comprising:
    monitoring for downlink control information comprising a wakeup signal from the network device.

11. A method for wireless communications at a network device, comprising:
    transmitting, to a user equipment (UE), a configuration for a plurality of listen-before-talk bandwidths, wherein each listen-before-talk bandwidth of the plurality of listen-before-talk bandwidths is associated with one or more downlink control channel candidates of a search space for a control resource set; and
    transmitting, during a first transmit occasion associated with a first discontinuous reception (DRX) cycle based at least in part on a first subset of listen-before-talk bandwidths of the plurality of listen-before-talk bandwidths or on a second transmit occasion associated with a second DRX cycle based at least in part on a second subset of listen-before-talk bandwidths of the plurality of listen-before-talk bandwidths, downlink control information based at least in part on the UE being configured with a total number of blind hypotheses in a set of blind hypotheses that is equal to or greater than a total number of listen-before-talk bandwidths in the plurality of listen-before-talk bandwidths.

12. The method of claim 11, wherein transmitting the downlink control information further comprises:
   transmitting a wakeup signal during a wakeup signal period of the UE; and
   transmitting to the UE on the first subset or the second subset of listen-before-talk bandwidths during a DRX duration of the first DRX cycle or the second DRX cycle, respectively, based at least in part on transmitting the wakeup signal.

13. The method of claim 11, further comprising:
   transmitting an indication of the first subset of the plurality of listen-before-talk bandwidths and the second subset of the plurality of listen-before-talk bandwidths.

14. The method of claim 13, wherein transmitting the indication of the first subset of the plurality of listen-before-talk bandwidths and the second subset of the plurality of listen-before-talk bandwidths comprises:
   transmitting in connection with the configuration for the plurality of listen-before-talk bandwidths, a control resource set configuration comprising the indication of the first subset of the plurality of listen-before-talk bandwidths and the second subset of the plurality of listen-before-talk bandwidths.

15. The method of claim 11, wherein transmitting the downlink control information further comprises:
   transmitting the downlink control information using a beam associated with the first subset of listen-before-talk bandwidths or the second subset of listen-before-talk bandwidths.

16. The method of claim 15, further comprising:
   transmitting a corresponding transmission configuration indicator (TCI) state for each listen-before-talk bandwidth of the plurality of listen-before-talk bandwidths, wherein each listen-before-talk bandwidth of the plurality of listen-before-talk bandwidths is associated with a corresponding beam based at least in part on the corresponding TCI state.

17. An apparatus for wireless communications at a user equipment (UE), comprising:
   a processor,
   memory coupled with the processor; and
   instructions stored in the memory and executable by the processor to cause the apparatus to:
      receive, from a network device, a configuration for a plurality of listen-before-talk bandwidths, wherein each listen-before-talk bandwidth of the plurality of listen-before-talk bandwidths is associated with one or more downlink control channel candidates of a search space for a control resource set; and
      monitor, during a first monitoring occasion associated with a first discontinuous reception (DRX) cycle, a first subset of listen-before-talk bandwidths of the plurality of listen-before-talk bandwidths and, during a second monitoring occasion associated with a second DRX cycle, a second subset of listen-before-talk bandwidths of the plurality of listen-before-talk bandwidths based at least in part on a set of blind hypotheses associated with the listen-before-talk bandwidths, wherein a total number of blind hypotheses in the set of blind hypotheses is equal to or greater than a total number of listen-before-talk bandwidths in the plurality of listen-before-talk bandwidths.

18. The apparatus of claim 17, wherein the instructions to monitor the first subset of the plurality of listen-before-talk bandwidths are executable by the processor to cause the apparatus to:
   monitor the first subset of listen-before-talk bandwidths during a wakeup signal period for a wakeup signal from the network device; and
   determine whether to wake up and monitor a DRX duration of the first DRX cycle based at least in part on a detection of the wakeup signal.

19. The apparatus of claim 17, wherein the instructions are executable by the processor to cause the apparatus to:
   monitor the first subset of the plurality of listen-before-talk bandwidths based at least in part on a first subset of the set of blind hypotheses and monitor the second subset of the plurality of listen-before-talk bandwidths based at least in part on a second subset of the set of blind hypotheses.

20. The apparatus of claim 19, wherein the instructions are further executable by the processor to cause the apparatus to:
   receive from the network device an indication of the first subset of the plurality of listen-before-talk bandwidths and the second subset of the plurality of listen-before-talk bandwidths.

21. The apparatus of claim 20, wherein the instructions to receive the indication of the first subset of the plurality of listen-before-talk bandwidths and the second subset of the plurality of listen-before-talk bandwidths are executable by the processor to cause the apparatus to:
   receive in connection with the configuration for the plurality of listen-before-talk bandwidths, a control resource set configuration comprising the indication of the first subset of the plurality of listen-before-talk bandwidths and the second subset of the plurality of listen-before-talk bandwidths.

22. The apparatus of claim 17, wherein the instructions to monitor the first subset of listen-before-talk bandwidths are executable by the processor to cause the apparatus to:
   monitor a first listen-before-talk bandwidth of the plurality of listen-before-talk bandwidths using a first beam; and
   monitor a second listen-before-talk bandwidth of the plurality of listen-before-talk bandwidths using a second beam.

23. The apparatus of claim 22, wherein the instructions are further executable by the processor to cause the apparatus to:
   receive from the network device a transmission configuration indicator (TCI) for each listen-before-talk bandwidth of the plurality of listen-before-talk bandwidths; and
   determine the first beam and the second beam respectively based at least in part on the TCI received for each of the first listen-before-talk bandwidth and the second listen-before-talk bandwidth.

24. The apparatus of claim 17, wherein the instructions are further executable by the processor to cause the apparatus to:
   monitor for downlink control information comprising a wakeup signal from the network device.

25. An apparatus for wireless communications at a network device, comprising:
a processor,
memory coupled with the processor; and
instructions stored in the memory and executable by the processor to cause the apparatus to:
transmit, to a user equipment (UE), a configuration for a plurality of listen-before-talk bandwidths, wherein each listen-before-talk bandwidth of the plurality of listen-before-talk bandwidths is associated with one or more downlink control channel candidates of a search space for a control resource set; and
transmit, during a first transmit occasion associated with a first discontinuous reception (DRX) cycle based at least in part on a first subset of listen-before-talk bandwidths of the plurality of listen-before-talk bandwidths or on a second transmit occasion associated with a second DRX cycle based at least in part on a second subset of listen-before-talk bandwidths of the plurality of listen-before-talk bandwidths, downlink control information based at least in part on the UE being configured with a total number of blind hypotheses in a set of blind hypotheses that is equal to or greater than a total number of listen-before-talk bandwidths in the plurality of listen-before-talk bandwidths.

26. The apparatus of claim 25, wherein the instructions are further executable by the processor to cause the apparatus to:
transmit an indication of the first subset of the plurality of listen-before-talk bandwidths and the second subset of the plurality of listen-before-talk bandwidths.

27. The apparatus of claim 26, wherein the instructions to transmit the indication of the first subset of the plurality of listen-before-talk bandwidths and the second subset of the plurality of listen-before-talk bandwidths are executable by the processor to cause the apparatus to:
transmit in connection with the configuration for the plurality of listen-before-talk bandwidths, a control resource set configuration comprising the indication of the first subset of the plurality of listen-before-talk bandwidths and the second subset of the plurality of listen-before-talk bandwidths.

28. The apparatus of claim 25, wherein the instructions to transmit the downlink control information further are executable by the processor to cause the apparatus to:
transmit the downlink control information using a beam associated with the first subset of listen-before-talk bandwidths or the second subset of listen-before-talk bandwidths.

* * * * *